US009922075B2

(12) United States Patent
Fowler

(10) Patent No.: US 9,922,075 B2
(45) Date of Patent: Mar. 20, 2018

(54) SCALABLE DISTRIBUTED TRANSACTION PROCESSING SYSTEM

(71) Applicant: New Technology/Enterprise Ltd., Buckinghamshire (GB)

(72) Inventor: Matthew Fowler, Middlesex (GB)

(73) Assignee: New Technology/Enterprise Ltd., Buckinghamshire (GB)

( * ) Notice: Subject to any disclaimer, the term of this patent is extended or adjusted under 35 U.S.C. 154(b) by 189 days.

(21) Appl. No.: 14/345,795

(22) PCT Filed: Sep. 18, 2012

(86) PCT No.: PCT/GB2012/052304
§ 371 (c)(1),
(2) Date: Mar. 19, 2014

(87) PCT Pub. No.: WO2013/041852
PCT Pub. Date: Mar. 28, 2013

(65) Prior Publication Data
US 2014/0330767 A1    Nov. 6, 2014

(30) Foreign Application Priority Data
Sep. 19, 2011    (GB) .................................. 1116166.8

(51) Int. Cl.
*G06F 17/30*    (2006.01)
*G06F 9/46*    (2006.01)

(52) U.S. Cl.
CPC ........ *G06F 17/30377* (2013.01); *G06F 9/466* (2013.01); *G06F 17/30604* (2013.01)

(58) Field of Classification Search
CPC .................... G06F 17/30377; G06F 17/30312
See application file for complete search history.

(56) References Cited

U.S. PATENT DOCUMENTS

| 5,864,679 A | 1/1999 | Kanai et al. |
| 7,613,743 B1 * | 11/2009 | Giampaolo ......... G06F 11/1474 |

(Continued)

FOREIGN PATENT DOCUMENTS

| GB | 2472620 | 2/2011 |
| WO | WO 02/027561 | 4/2002 |
| WO | WO 2008/088931 | 7/2008 |
| WO | WO 2011/018646 | 2/2011 |

OTHER PUBLICATIONS

International Search Report and Written Opinion for PCT/GB2012/052304 dated Apr. 2, 2013 (15 pages).

(Continued)

*Primary Examiner* — Alexander Khong
(74) *Attorney, Agent, or Firm* — Merchant & Gould P.C.

(57) ABSTRACT

Transactional data accesses are performed in a data storage system, where the data storage system is configured to store a plurality of data objects identified by respective key values. A request is received to modify the value of a particular data object. The request specifies a modified object value and a key value identifying the data object to be modified. In response to the request, a transactional data object is created, the transactional data object specifying a transaction identifier, the original object value and the modified object value. The transactional data object is stored in the data storage system, and associated with the key value.

19 Claims, 8 Drawing Sheets

(56) References Cited

U.S. PATENT DOCUMENTS

| | | | |
|---|---|---|---|
| 2002/0165724 A1* | 11/2002 | Blankesteijn | G06Q 30/06 |
| | | | 705/1.1 |
| 2004/0010499 A1 | 1/2004 | Ghosh et al. | |
| 2006/0085456 A1* | 4/2006 | Pickering | G06F 17/30309 |
| 2007/0185920 A1* | 8/2007 | Castro | G06F 17/30578 |
| 2008/0250272 A1 | 10/2008 | Barnes et al. | |
| 2010/0169289 A1* | 7/2010 | Newport | G06F 9/466 |
| | | | 707/705 |
| 2011/0138126 A1 | 6/2011 | Blundell et al. | |
| 2012/0259809 A1* | 10/2012 | Hermann | G06F 17/30563 |
| | | | 707/600 |
| 2013/0019000 A1* | 1/2013 | Markus | G06F 9/466 |
| | | | 709/223 |
| 2013/0110766 A1* | 5/2013 | Promhouse | G06F 9/466 |
| | | | 707/607 |

OTHER PUBLICATIONS

United Kingdom Search Report for Application No. GB1116166.8 dated Jan. 20, 2012 (5 pages).
Ananian et al. "Unbounded Transaction Memory." *Proceedings of the 11th Symposium on High-Performance Computer Architecture.* 2005. pp. 316-327.
Barnes et al. "Logging Last Resource Optimization for Distributed Transactions in Oracle WebLogic Server." *EDBT.* 2010. 6 pages.
Grand. "Transaction Patterns: A Collection of Four Transaction Related Patterns." *Plop Conference.* 1999. pp. 1-30. http:hillside.net/plop/plop99/proceedings/grand/plop_99_transaction_patterns.pdf.

* cited by examiner

SCALABLE DISTRIBUTED TRANSACTION PROCESSING SYSTEM

This application is a National Stage Application of PCT/GB2012/052304, filed 18 Sep. 2012, which claims benefit of Serial No. 1116166.8, filed 19 Sep. 2011 in Great Britain and which applications are incorporated herein by reference. To the extent appropriate, a claim of priority is made to each of the above disclosed applications.

BACKGROUND OF THE INVENTION

The present invention relates to systems and methods for processing distributed transactions, for example in grid-based distributed processing architectures.

In distributed applications, where processing is distributed across nodes in a large system, conventional—i.e. database-oriented—distributed transactions become slow and unreliable. As the number of nodes in the system increases, distributed transactions become increasingly sub-optimal, to the point where conventional three-tier architectures become impractical in large commercial applications.

In-memory data grids, which store data in memory across a grid of processing elements, have been used (for example as caches for application data) to improve the performance of certain types of applications. Products such as the GigaSpaces platform from GigaSpaces Technologies and Oracle's Coherence have been developed to simplify development of grid-based applications. However, such applications are typically implemented without distributed transactions due to their poor performance, and unreliability in large-scale deployments. This can make it difficult to ensure that data in the data grid and in any associated persistent storage is maintained in a consistent state. Where distributed processes fail, manual intervention may be required to restore consistency to the data. For most large-scale environments, this reduces the utility of standard relational database systems to such an extent that alternative data storage products and architectures are being developed, which increases the training cost and architecture risk. Also, since managers responsible for such applications typically require changes to application data to be persisted, for example to a conventional disk-based relational database, processes can be held up waiting for disk writes to complete, and so the full potential advantages of using an in-memory data grid are typically not realised.

Due to the above problems, data grids have typically not been used in OLTP (online transaction processing) systems. In such systems, it is typically required that data changes are persisted to permanent storage, usually a disk-based database system, before transactions are considered complete, leading to low overall performance in grid deployments.

The present invention seeks to alleviate these problems.

SUMMARY OF THE INVENTION

In a first aspect of the invention, there is provided a method of performing transactional data accesses in a data storage system, wherein the data storage system is configured to store a plurality of data entities identified by respective key values, the method comprising: receiving a request to modify the value of a data entity having a first value to a second value, the request associated with a transaction and including a key value (or information identifying, referencing or determining a key value) identifying the data entity to be modified; in response to the request, creating a transactional data entity, the transactional data entity including information relating to the requested modification; storing the transactional data entity in the data storage system; and associating the transactional data entity with the key value.

In this way, information relating to a modification of a data entity carried out under a transaction can be stored directly with the data entity in question, instead of separately (e.g. in a transaction manager's memory). This can simplify handling of transactions (especially distributed transactions in an in-memory data grid, where the location of data entities in the grid is under the control of the grid rather than the application).

It should be noted that data entities may be simple or complex data entities, and hence the value for a data entity (e.g. the first and second value mentioned above) may similarly be a simple value or complex value. A simple value may, for example, be an integer, floating point or other number or a character or character string or a Boolean value or any other simple data type. A complex value may be a data structure consisting of multiple components, e.g. a record or object having multiple component data elements (fields or attributes), which may themselves be simple or complex. For example, data entities may be Java objects or objects in another object-oriented environment. In that case, the value of such an object typically comprises multiple object attribute values.

Any suitable types of identifier which can identify data entities in the storage system can be used as keys or key values.

In a preferred embodiment, the data-storage system comprises an in-memory data grid, preferably in the form of a grid of processing nodes storing application data in memory (typically volatile memory/RAM, or other local node storage which is relatively fast to access compared to persistent/remote databases). Each node may be a hardware node (e.g. server) or a software node (e.g. a virtual machine running on a server). The nodes preferably perform data accesses based on keys identifying data entities (with the grid or associated support infrastructure preferably routing data accesses to appropriate nodes based on the keys).

In this approach, the plurality of data entities are preferably stored in the in-memory data grid, with the data entity being updated being stored at a given node of the data grid. The transactional data entity is then preferably stored in the same node as the data entity being changed.

The transactional data entity preferably specifies one or both of: the first value and the second value. Thus, the transactional data entity may contain (or reference) both the value of the data entity prior to the modification, and the value of the data entity after the modification. By storing the state of an in-progress transaction in this way, changes to the data entity can be committed or rolled back in a straightforward way when the transaction is committed or rolled back. The second value is preferably specified in the request.

When reference is made herein to a data entity "specifying" some value or information, it should be understood that the data entity may specify the value or information by including the value or information, or by referencing the value or information (which may thus be stored separately), or by providing any other information that allows the specified value or information to be derived.

Preferably, the transactional data entity specifies a transaction identifier for the transaction. This transaction identifier may be specified in the request. In this way, the transaction state can be associated with the particular transaction that caused the modification.

Storing the transactional data entity may comprise replacing the data entity with the transactional data entity and/or deleting the data entity. Thus, the transactional data entity may take the place of the original data entity in the data storage system in such a way that subsequent attempts to access, retrieve or modify the data entity will access the transactional data entity instead of the original data entity.

Alternatively or additionally, the method may comprise associating the transactional data entity with the data entity. For example, the method may comprise adding the transactional data entity to the data entity, preferably as one or more additional properties or as one or more decorations of the data entity.

Alternatively, the data entity may be stored in a first collection (e.g. a main cache) of data entities, the method comprising storing the transactional data entity in a second collection (e.g. a side cache) of data entities, preferably wherein the key value is associated with the data entity in the first collection and with the transactional data entity in the second collection.

Preferably, where the data entity is not replaced with the transactional data entity (or wrapper object), the data entity is not updated (i.e. it maintains the first value) until the transaction is committed, during which time the second value is stored in the associated transactional data entity.

Preferably, the method comprises accessing the transactional data entity in response to a subsequent request to access a data entity where the subsequent access request specifies the key value.

The subsequent request may be processed in dependence on the type of access (e.g. depending on whether it is a read access or a write access). For example, when the subsequent request is a request to modify or delete the data entity, the request may be rejected. In this way, a subsequent transaction can be prevented from overwriting an object which is being modified by an earlier transaction that has not yet been committed. When the subsequent request is a request to read the data entity, the method may comprise returning a value of the data entity in response to the request. Alternatively, the request could be rejected.

The subsequent request preferably specifies a second transaction identifier, the method comprising processing the subsequent request in dependence on the second transaction identifier. In particular, the method may comprise processing the subsequent request in dependence on whether the second transaction identifier corresponds to (e.g. matches) the transaction identifier. Thus, different actions may be taken depending on whether a subsequent attempt to access the data entity is for the same transaction already modifying the data entity or is for a different transaction.

The method may comprise rejecting the subsequent request if the second transaction identifier does not correspond to the transaction identifier, the rejecting step preferably performed if the subsequent request is for a write access. On the other hand, the subsequent request may be allowed and carried out if the second transaction identifier corresponds to the transaction identifier. In this way, a transaction may be allowed to update a data entity multiple times, but one transaction may not overwrite another transaction's updates before they have been committed.

If the subsequent request is for a read access, the method may comprise returning either the first value or the second value in dependence on whether the second transaction identifier corresponds to (e.g. matches) the transaction identifier. Thus, for a data entity under transaction, a read access may read the original value if the transaction performing the read is a different transaction, or may read the updated value if the transaction performing the read is the same transaction as the one that originally updated the data entity. Other possibilities for reading with a different transaction are to disallow the read, or cause the reader to wait for an unlock.

The subsequent request may be processed in dependence on a preconfigured policy. Thus, different actions may be taken depending on a selected policy, providing greater flexibility in how transactional data accesses are handled.

Preferably, the method comprises: receiving a request to commit the transaction; in response to the request, storing an updated data entity in the data storage system, the updated data entity having the second value; and associating the updated data entity with the key value. The transactional data entity may be replaced with the updated data entity and/or may be deleted. The method may also comprise: receiving a request to roll back the transaction; and in response to the request, associating a data entity corresponding to the original data entity and having the first value with the key value.

The data entity and the updated data entity preferably have a first data structure and the transactional data entity has a second data structure different from the first data structure. The second data structure may include (or include references to) the data entity and the updated data entity together with additional transaction information, for example the transaction identifier.

Preferably, the method comprises receiving a further request to modify the value of the data entity; and modifying the transactional data entity to include information relating to the further requested modification. The transactional data entity may specify a plurality of modified values for the data entity (e.g. corresponding to multiple modifications associated with different transactions). Each modified value may thus be associated with a respective transaction or transaction identifier.

For example, the transactional data entity may include three or more values for the data entity (including the original value and two or more modified values). The transactional data entity may include time values associated with respective values for the data entity. The time values preferably indicate times for which the respective time values are valid, and more specifically may indicate times at which the respective values became valid. Thus, in response to a read request specifying the key value, the method may comprise returning one of a plurality of values for the data entity specified in the transactional data entity in dependence on their associated time values.

The read request is preferably associated with a time, e.g. a transaction time, the method comprising comparing the time to the time values associated with the plurality of values for the data entity and returning a selected one of the plurality of values in dependence on the comparison (e.g. returning the value for the data entity having an associated validity time equal to, or most recently preceding, the time associated with the read request).

Each of the plurality of values for the data entity is preferably associated with a transaction (possibly excluding the first or original value). The transactional data entity may include, for each value for the data entity associated with a transaction, a time value indicating when the associated transaction was committed or an indication that the associated transaction has not been committed.

In a further aspect of the invention, there is provided a method of performing transactional data accesses in a data storage system, wherein the data storage system is configured to store a plurality of data entities identified by respective key values, the method comprising, for a given data entity associated with a given key value: creating a transactional data entity, the transactional data entity specifying a plurality of entity values for the given data entity, and time values associated with one or more of the entity values, each time value indicating a validity time for an associated entity value; the method further comprising storing the transactional data entity in the data storage system; and associating the transactional data entity with the given key value. The transactional data entity may include, for each entity value, a time value indicating a commit time for an associated transaction or an indication that an associated transaction has not been committed. The method may comprise receiving a request to update the given data entity, the request specifying the given key value and a new entity value for the given data entity; and adding the new entity value to the transactional data entity. Any of the features and method steps of the first aspect described above may also be applied to this method aspect.

In a further aspect of the invention, there is provided a method of performing transactional data accesses in a data storage system, wherein the data storage system is configured to store a plurality of data objects identified by respective key values, the method comprising: for a data object stored in the data storage system and having a first object value, receiving a request to modify the value of the data object to a second object value, wherein the request specifies the second object value and a key value identifying the data object to be modified; in response to the request, creating a transactional data object, the transactional data object specifying a transaction identifier, the first object value and the second object value; storing the transactional data object in the data storage system; and associating the transactional data object with the key value. Any of the features and method steps of the first aspect described above may also be applied to this method aspect.

In a further aspect of the invention (which may be combined with any of the above aspects), there is provided a method of coordinating transactions managed by a plurality of (preferably concurrently running) transaction managers, the transactions involving data updates to data stored in a first storage system, the method comprising: receiving transaction information relating to a transaction managed by a given one of the transaction managers, the transaction including (or resulting in) one or more updates to data in the first storage system, the transaction information identifying one or more data entities updated by the transaction; for each identified data entity, recording the transaction in a data structure associated with the data entity, the data structure adapted to: record a set of transactions having updated the data entity; and indicate an order associated with the set of transactions; the method further comprising determining whether the transaction's data updates can be propagated to a second storage system, the determining comprising determining that the data updates can be propagated if, for each of the data entities updated by the transaction, there are no transactions recorded for the data entity which precede the transaction in accordance with the indicated order; and initiating propagation of the data updates to the second storage system in response to determining that the transaction's data updates can be propagated.

This approach allows dependencies between transactions to be tracked and managed in an efficient and scalable manner, and can help ensure consistency of data and isolation between transactions. Where the second storage system is a persistent storage medium, propagating data updates is also referred to herein as persisting data updates.

The method preferably further comprises: receiving a message indicating that the data updates have been propagated to the second storage system (preferably that all the data updates for the transaction have been propagated); and for each data entity updated by the transaction, removing the transaction from the set of transactions recorded for the data entity.

The data structure for a given data entity preferably comprises (or specifies) an ordered list of transactions, the recording step comprising adding the transaction to the list. The transaction is preferably added at the end of the list. The determining preferably comprises determining that the data updates can be propagated if, for each of the data entities updated by the transaction, there are no transactions recorded for the data entity which precede the transaction in the list associated with that data entity.

The method may comprise receiving a request from the given transaction manager requesting permission to propagate the transaction's updates, the request including the transaction information. An acknowledgement of the request is preferably sent to the transaction manager. Preferably, a request number is assigned to the request and returned to the transaction manager with the acknowledgement.

Preferably, the data structure (e.g. list) for a given data entity indicates the order in which requests were received for respective transactions and/or the order in which request numbers were assigned. This allows a priority order to be defined for propagating different transactions' data updates.

The method preferably comprises, at the given transaction manager: receiving an instruction to commit the transaction; and in response to the instruction: sending the request; and committing the transaction to the first storage system. The method may comprise receiving at the given transaction manager an acknowledgement of the request, and wherein the committing step is preferably performed after (or in response to) receipt of the acknowledgement.

Preferably, initiating propagation comprises sending a message to the given transaction manager, the message indicating to the transaction manager that the transaction updates can be propagated, the method preferably further comprising, at the given transaction manager, propagating the transaction's updates to the second storage system in response to the message. This allows propagation of different transactions' respective updates to be coordinated effectively.

The method preferably comprises propagating the transaction updates to the second storage system. Propagating the transaction's updates preferably comprises transmitting update information to the second storage system, and implementing the updates at the second storage system based on the update information.

The second storage system may comprise a plurality of target storage systems, and the transaction's data updates may comprise updates relating to multiple of the plurality of target storage systems. The determining step may then comprise: determining whether the transaction's data updates can be propagated to each of the multiple target storage systems; and initiating propagation of the transaction's data updates to each of the multiple target storage systems in response to determining that the data updates can be propagated. The determining and initiating steps are preferably performed independently for each target storage system, for example in response to an independent request from the transaction manager relating to the target storage system. The determining and initiating steps may be performed by separate transaction coordination modules as set out in more detail below.

The initiating step may comprise sending a message to the transaction manager independently for a respective one of the multiple target storage systems when it is determined that the transaction's data updates relating to the respective target storage system can be propagated to that target storage system.

Alternatively, the determining step and initiating steps may be performed for all of the multiple target storage systems in a single operation.

The receiving, recording and determining steps are preferably performed at one or more transaction coordination modules (also referred to below in relation to a particular embodiment as an Isolator).

The second storage system may comprise a plurality of target storage systems, the transaction's data updates comprising updates relating to multiple of the plurality of target storage systems; the receiving, recording and determining steps may then be performed at a plurality of transaction coordination modules, each transaction coordination module associated with respective one(s) of the plurality of target storage systems. In this way, different coordination modules (e.g. running on different nodes of the grid) may be responsible for coordinating propagation of updates to different target storage systems or groups of target storage systems. Thus, each transaction coordination module may determine whether updates to its associated target storage systems can be persisted (preferably independently and irrespective of the status of updates to other target storage systems).

The method may then comprise receiving, at a given one of the plurality of transaction coordination modules, a request to propagate one or more data updates associated with the transaction to a given target storage system associated with the given transaction coordination module, and in response, performing at the given transaction coordination module the determining step to determine whether the data updates can be propagated to the given target storage system. Propagation may then be initiated (preferably independently) for the given target storage system as already set out above. This process may be carried out independently for each transaction coordination module (so that all the data updates of the transaction are propagated to their respective target storage systems).

The method may comprise receiving first transaction information relating to a transaction at a first transaction coordination module, the first transaction information identifying one or more first data entities updated by the transaction; and at the first transaction coordination module, for each identified data entity, recording the transaction in a data structure associated with the data entity as set out above; determining whether the data updates can be propagated to a first target storage system in the manner set out above, and initiating propagation of the data updates to the first target storage system in response to determining that the data updates can be propagated. The method may further comprise receiving second transaction information relating to the transaction at a second transaction coordination module (preferably running concurrently with the first transaction coordination module), the second transaction information identifying one or more second data entities updated by the transaction; and at the second transaction coordination module, for each identified data entity, recording the transaction in a data structure associated with the data entity as set out above; determining whether the data updates can be propagated to a second target storage system in the manner set out above, and initiating propagation of the data updates to the second target storage system in response to determining that the data updates can be propagated.

Preferably, the method comprises, in response to failure (or other termination) of a transaction coordination module: sending, by a backup transaction coordination module, a request to each transaction manager; receiving from each transaction manager transaction information relating to transactions whose updates have not yet been propagated to the second storage system; and based on the received transaction information, reconstructing the data structures associated with the data entities that are being updated by the transactions. This may allow the backup transaction coordination module to rebuild its internal data structures (i.e. its transaction log), in particular the ordered lists of transactions associated with respective data entities, without the need to have had that information cached and/or backed up locally. Avoiding this need for local storage of information at the transaction coordination module can improve the scalability of the system.

The transaction information received from the transaction managers may include, for each transaction, the request number previously assigned by the failed transaction coordination module. The reconstructing step then preferably comprises recording transactions in the order specified by their request numbers. This can ensure the original priority ordering of transactions is maintained. The received transaction information may also include the information originally transmitted to the failed transaction coordination module, e.g. information identifying one or more data entities updated by the transaction, to thereby allow the lists to be reconstructed.

The plurality of transaction managers may be running on a plurality of processing nodes, preferably wherein the processing nodes are nodes of an in-memory data grid. The transaction coordination module(s) may also run on a node (nodes) of the data grid.

Further aspects of the invention provide a transaction coordination module and a transaction manager adapted to participate in the above methods (by way of being adapted to perform the relevant method steps).

In a further aspect of the invention, there is provided a data storage system configured to store a plurality of data entities identified by respective key values, the system comprising: means for receiving a request to modify the value of a data entity having a first value to a second value, the request associated with a transaction and including a key value identifying the data entity to be modified; means for, in response to the request, creating a transactional data entity, the transactional data entity including information relating to the requested modification; means for storing the transactional data entity in the data storage system; and means for associating the transactional data entity with the key value.

In a further aspect of the invention, there is provided a system for coordinating transactions managed by a plurality of concurrently running transaction managers, the transactions involving data updates to data stored in a first storage system, the system comprising: means for receiving transaction information relating to a transaction managed by a given one of the transaction managers, the transaction resulting in one or more updates to data in the first storage system, the transaction information identifying one or more data entities updated by the transaction; means for, for each identified data entity, recording the transaction in a data structure associated with the data entity, the data structure adapted to: record a set of transactions having updated the data entity; and indicate an order associated with the set of transactions; means for determining whether the transaction's data updates can be propagated to a second storage system, the determining means configured to determine that the data updates can be propagated if, for each of the data entities updated by the transaction, there are no transactions recorded for the data entity which precede the transaction in accordance with the indicated order; and means for initiating propagation of the data updates to the second storage system in response to determining that the transaction's data updates can be propagated. In the above aspects, any of the recited means for performing specified activities may be provided in the form of a processor and associated memory storing instructions for performing the activities when executed by the processor.

The invention also provides a computer-readable medium comprising software code adapted, when executed by a data processing system, to perform a method as set out above, and a system or apparatus or data storage system or transaction coordination system having means for performing a method as set out above.

More generally, the invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which.

DETAILED DESCRIPTION

Figure 1:
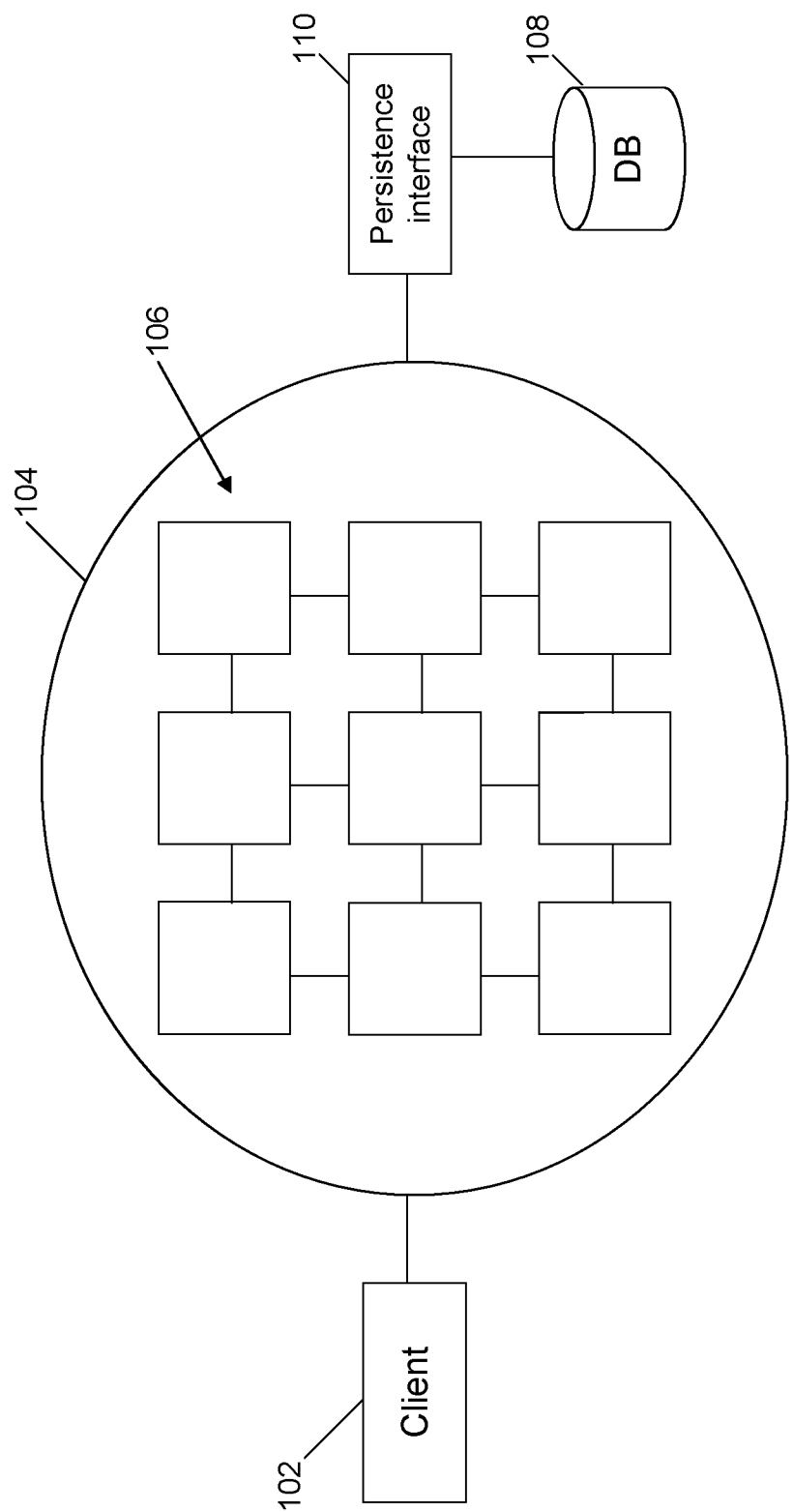
FIG. 1 illustrates a grid-based transaction processing system.

A grid-based transaction processing system is illustrated in overview in FIG. 1. The system includes an In-Memory Data Grid (IMDG) 104 for providing data storage and application services for one or more applications. A persistent copy of the application data is stored in database 108. A client 102 connects to the grid 104 to perform operations relating to application data stored in the grid, for example by invoking application services implemented in the grid.

In a preferred embodiment, the in-memory data grid 104 is the system of record for the application data, meaning that during the lifetime of a transaction the grid is considered to hold the currently valid, authoritative version of the data. The database 108 stores a persistent copy of that data, but updating of that persistent copy occurs asynchronously and possibly with some delay after changes have been made in the IMDG, meaning that the database may not be fully up-to-date at any given time. This approach allows application services to be provided with reduced latency, since only memory updates in the grid are required to complete data manipulation operations, without an application having to wait for changes to be recorded ("persisted") in the persistent database, which typically involves disk (rather than memory) writes.

The IMDG 104 comprises a number of interconnected computing nodes 106. Each computing node may be a separate physical server. Alternatively, the computing nodes may be separate virtual machines, for example, Java virtual machines, running on one or more physical servers (e.g. each physical server could run one or more virtual machines as grid nodes). Each node stores a portion of the application data. Additionally, each node may include application code (e.g. Java code) implementing application services which operate on the application data. These application services may be invoked by the client 102 (which may include a corresponding application client, for example as a dedicated application program or as a web browser running a web-based application front-end).

In a preferred embodiment, the persistent database 108 is in the form of a relational database. In such a database, application data is stored in a series of tables. The in-memory application data in the grid, on the other hand, is stored as a set of objects, preferably in an object-oriented computing environment such as a Java-based execution environment. A collection of such objects stored in the grid is referred to herein as a "cache" (even though the grid may or may not operate as a cache in the conventional sense). As set out in more detail below, the cache may be distributed across some or all nodes of the IMDG. The grid may comprise multiple caches (for example for multiple applications). Additionally, a further cache may hold transaction management information. Different caches may or may not share the same nodes.

At startup, data is loaded from the relational database into a set of data objects in the cache in the IMDG. Changes to in-memory data objects are persisted back to the database by mapping the objects back to the relevant database tables. Persistence is handled by a persistence interface 110.

The IMDG may hold a full copy of the application data stored in the database or may hold only a subset of the database, with data brought into the IMDG as necessary.

Figure 6:
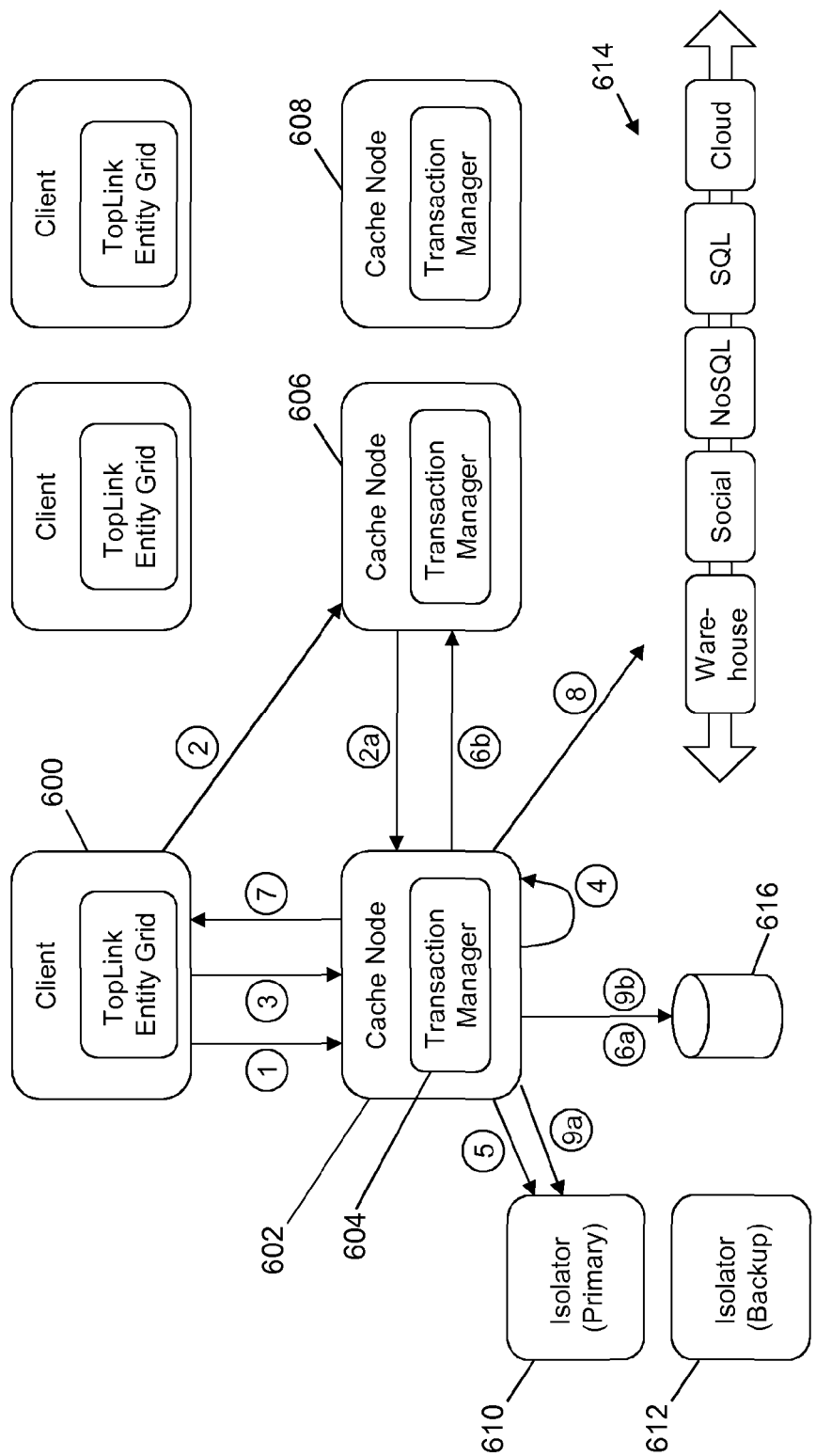
FIG. 6 illustrates the operation of the distributed transaction processing system.

Although a single persistent database 108 is shown, the system may in fact include multiple target persistence media, e.g. multiple relational databases or other storage systems (as shown in FIG. 6). These typically store different parts of the data processed in the IMDG (although data could also be duplicated across persistence media). A single transaction may involve updates to just one, multiple, or even all of the available persistence media. Thus, where reference is made herein to a single persistent database, it should be understood that there may in fact be multiple such databases.

Figure 2:
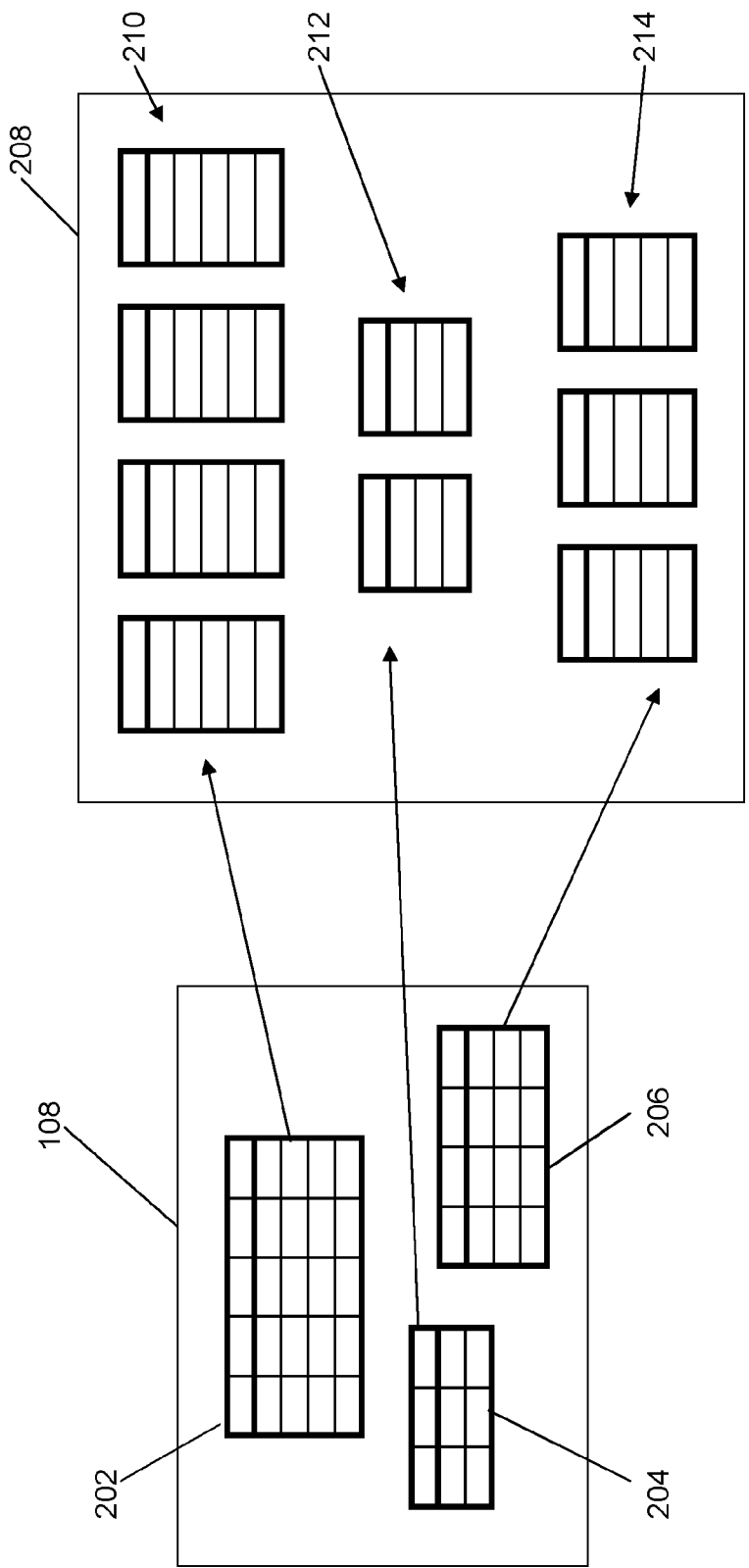
FIG. 2 illustrates mapping of a relational database to an object cache.

The relationship between the in-memory application data in the cache and the persistent relational database (or databases) is illustrated in more detail in FIG. 2. As shown in FIG. 2, each table in the relational database 108 maps to a set of objects in the cache 208. In this example, relational database 108 includes a plurality of database tables 202, 204 and 206. Table 202, in this example having four rows each with five data fields, maps to a set of four objects 210 in the cache 208, each with five data attributes corresponding to the table fields. Similarly, table 204 maps to a set of objects 212, and table 206 maps to a set of objects 214.

Figure 3:
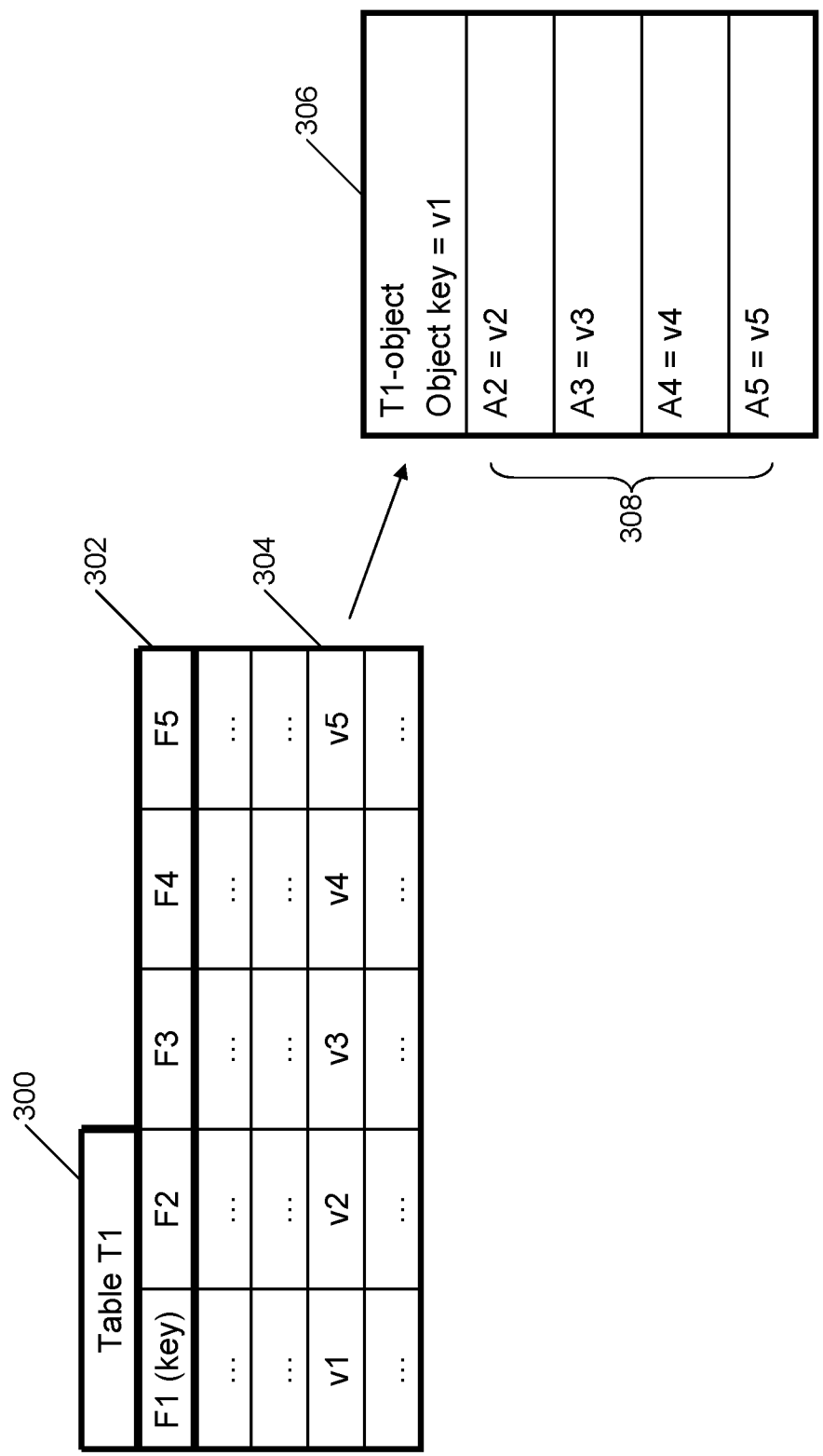
FIG. 3 illustrates the mapping of FIG. 2 in more detail.

The mapping is illustrated in more detail in FIG. 3. As shown, database table 300 is represented in the cache by a particular object class corresponding to the table. Each row of the table 300 corresponds to a particular object of that class. In this example, row 304 corresponds to object 306 in the cache. Relational database table 300 includes five fields F1, F2, F3, F4 and F5 (collectively 302). One of those fields (here F1) is also the primary key for the table (though in practice multiple fields may together form a primary key). This key value is used as an identifying key of the corresponding object 306 (alternatively the database key may map to a separate key identifying the corresponding object). The remaining attributes 308 of the object hold the data values from the other fields of the table row 304.

Figure 4:
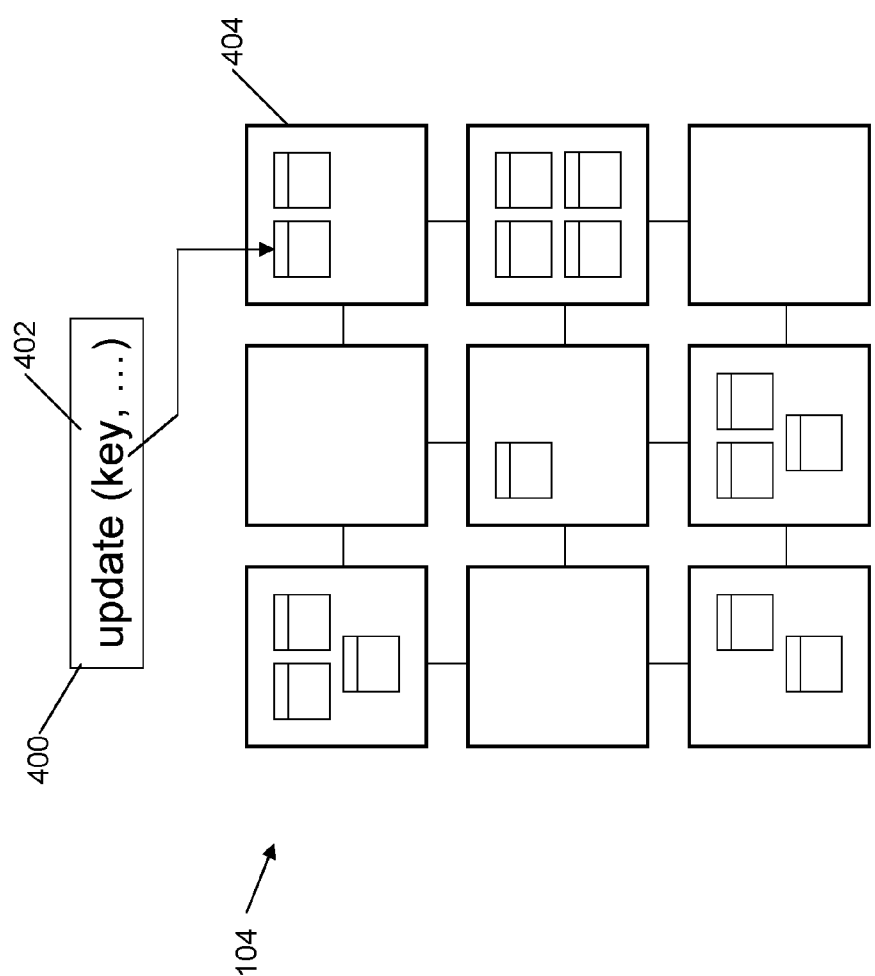
FIG. 4 illustrates the distribution of a cache across a grid and routing of data access requests in the grid.

The cache 208 is in practice distributed across the nodes of the IMDG. This is illustrated in FIG. 4, which shows (as an example) the IMDG 104 having nine nodes, with each node storing a subset of the objects in the cache. The grid uses the object key to route a data access request to the appropriate node. For example, an update request 400 specifies an object key value 402 identifying an object to be updated. The IMDG 104 uses the key value to route the request to the appropriate node, in this case node 404, where that data object is stored. The update request is then processed by the identified node (e.g. by invoking Java code in the Java Virtual Machine providing the node).

Applications executing in the grid may wish to access and/or modify multiple data objects as part of a single transaction. The term "transaction" refers to a group of operations in which either all of the operations are completed or, if that is not possible, then none of the operations are completed. This ensures that consistency of the application data is maintained, for example where a particular operation fails. In the present case, since data can be distributed across nodes in the IMDG, coordination across the grid is required to ensure transactionality. Accordingly, embodiments of the present invention provide a distributed transaction mechanism which is suitable for use in the above-described system (though the described approach can also be used in other environments).

The disclosed distributed transaction mechanism involves the following aspects:

the storage and handling of transactional state relating to data objects being accessed under a transaction
transaction management, implemented using a scalable distributed transaction management system These aspects are described in more detail below.

Storing Transactional State

In the present approach, instead of using a transaction manager to hold new object states for a transaction separately from the application data, transaction state information for each data object is associated directly with that data object. This is achieved by replacing a data object in the cache with a special object which holds transactional state when the object is subject to access under transaction. That object is referred to herein as a transaction wrapper object.

Figure 5:
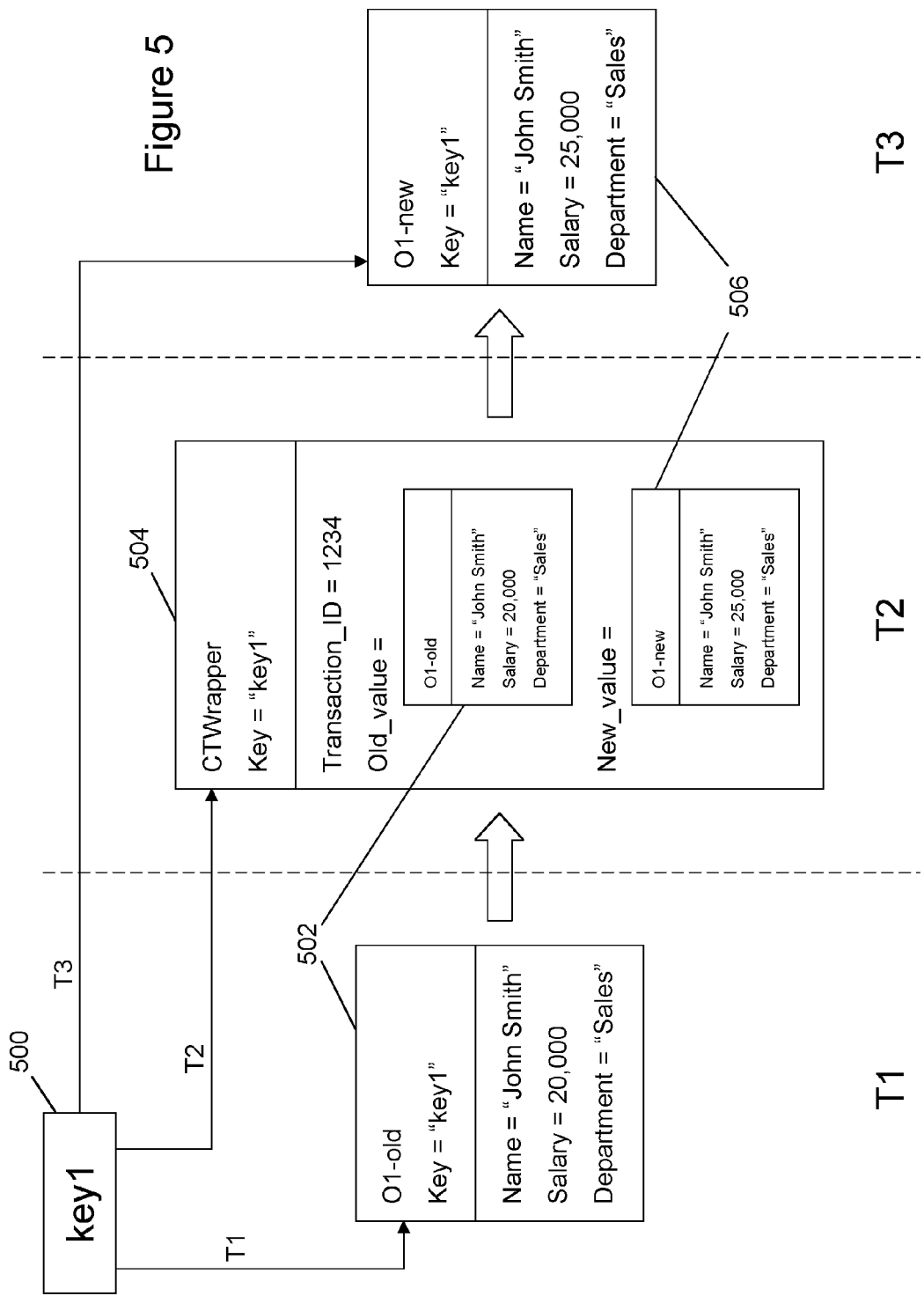
FIG. 5 illustrates the storing of transaction state information in the cache.

The approach is illustrated by way of example in FIG. 5.

In this example, a data object storing employee data for a particular employee is to be updated. At time T1, the old version 502 of the data object is stored in the cache and is identified by an object key 500 having key value "key1". An update request is received to modify the object, in this example to change the value of the "salary" attribute (currently 20,000) to a new value (25,000). The update is to be performed as part of a distributed transaction.

The update request specifies the key identifying the object to be changed, the new object value(s), and a transaction identifier, e.g.:

update (Transaction_ID=1234, Key="key1", Value=O1-new).

To perform the update, the original object "O1-old" 502 stored in the cache is replaced with a new transaction wrapper object "CTWrapper" 504 (time T2). The transaction wrapper object includes the transaction identifier (Transaction_ID), the old value of the data object (O1-old 502) and the new value of the data object (O1-new 506). Furthermore, the key mapping for key value "key1" is changed so that "key1" is now associated with the transaction wrapper object 504, instead of the original data object 502. This means that any future attempts to access the data object referenced by the key will access the transaction wrapper object 504 instead of the original data object 502.

The transaction wrapper object thus identifies the transaction which is modifying the data object (by way of the transaction ID), as well as holding both the old version and the new version of the data object, while the transaction is in progress (instead of holding the old and new versions of the objects the wrapper object could alternatively specify the object values by referencing separately stored data objects).

Subsequently, when the transaction commits (time T3), the transaction wrapper object 504 is deleted and replaced with the new version 506 of the data object which was stored in the wrapper object. The key mapping for key value "key1" is then again changed, this time so that "key1" is now associated with the new object 506, meaning that future data accesses will access the new version, i.e. the version that is valid after completion of the transaction.

To commit an entire transaction, the above process is carried out for each data object that has been modified by the transaction.

Rollback of the transaction is handled in a similar way, by replacing, for each object participating in the transaction, the transaction wrapper object 504 with the original version 502 of the data object and once again associating the key 500 with the original version of the object, thus reverting to the state at time T1.

As indicated above, if, at a time when the data object is being accessed under a transaction, another process or transaction attempts to access the same object, the key value "key1" will retrieve the transaction wrapper object 504 instead of the original object 502. Data access routines are modified to handle the attempted access appropriately in this situation to ensure consistency of data is maintained, for example, by preventing updates to the object by another transaction or to permit, deny or delay read accesses depending on circumstances, as described in more detail below.

The response to read and write requests under a transaction may be determined by way of configurable policies. For example, "Dirty Reads" could be requested, whereby a reader gets the value under transaction rather than "Read Committed" where reads return the previously committed value (the latter approach is described in more detail below and is preferably the default policy). In preferred embodiments, the default action for read and write requests is preferably configurable, but the required action can preferably also be specified on a per-transaction basis.

Once the transaction has committed (time T3), the new version of the data object 506 is available to be accessed by other processes or transactions as normal, without restrictions.

Example Implementation

In a preferred embodiment, the in-memory data grid is implemented using the Oracle Coherence product.

A typical Coherence deployment includes the grid, i.e. a set of nodes (Java Virtual Machines on specific machines), and a set of caches (a cache is termed 'NamedCache' in Coherence).

A cache in Coherence is a named, distributed key-value store. Such key-value stores typically provide operations such as:
  get(key)—reading the value or object matching the key
  put(key, value)—updating the value (object) matching the key
  contains(key)—checking whether a value (object) is present for the key
  remove(key)—deleting an object.

Caches being named means that a handle is provided to work with the cache using its name—e.g. getCache("Customer"). This also means that the system can use as many caches as required (for example, TopLink Grid puts different types of domain objects into different caches, named after database tables).

The preferred deployment for Coherence is to distribute cache contents. Coherence places portions of each NamedCache on all nodes in the grid. Specialised deployments can be used to limit this; the present system makes use of this ability as described later.

Each Coherence cache is partitioned into a number of "partitions". A partition is a collection of objects which is stored together in a single node of the grid and which is moved as a unit when the grid redistributes data, for example to accommodate load-balancing requirements. Typically, 257 is the starting number of partitions in a Coherence deployment—even if there are only two physical nodes in a grid. Multiple partitions are typically mapped onto each cache node. There are a fixed number of partitions defined by the configuration, and these are spread as equally as possible around the nodes in the grid. Since the cache is partitioned, data affinity can be used to take advantage of local processing where possible.

Cache keys identify objects in the cache as described above. The present approach uses the transactional wrapper ("CTWrapper") object as a special cache entry whose value is the transactional state when an entry is under a transaction. The CTWrapper object replaces the original cache entry for that key (see FIG. 5).

The unit of backup in Coherence is the partition. However, there is no concept of "this is a primary machine (at start) and this is a backup machine" because backup data is not sent to specific machines. Instead, backups of partitions are also evenly spread around the grid and each node in the grid acts both as primary and backup partitions (for different data). In other words, a given node may hold primary copies of some partitions and backup copies of other partitions. In fact, Coherence provides for any number of backups for the partitions, but for simplicity the present description will refer to only a single backup partition.

When a Coherence cache node fails, for each cache partition stored at the node, the corresponding backup partition (or one of them, if multiple backups are deployed) becomes the primary for that partition and the data is copied to a new backup partition, somewhere else on the grid. The backup partitions for the failed node's partitions will be distributed across different nodes of the grid. In other words, if a node fails, there is not a single node that takes over its responsibilities—the data and processing is evenly spread across the grid. When a node joins the grid, all pre-existing nodes donate some of their partitions to the new node.

Further background on Coherence can be found at:
  http://download.oracle.com/docs/cd/E15357_01/coh.360/e15724.pdf.

Thus, in the present approach, the transactional state is held in the standard Coherence cache as the value for a given cache key. There is no other state relating to transactions in the "cohort"—i.e. the Java Virtual Machine running a Coherence system.

The high-level data for the Coherence "transactional state in cache" design is:

CoherenceCache: Map {
    key :→ CTWrapper[old value, new value, transactionID] }

In other words, the design uses the standard Coherence cache. When an object is being manipulated by a transaction, the value is changed from a domain object instance to be a transaction-specific object ("CTWrapper") holding the old value (before the transaction), the new value and the transaction ID as described above.

Preferred embodiments use "null" as a special value to indicate "non-existent". Therefore the single CTWrapper can represent the standard data operations insert, update and delete, as follows:
  an insert has the old value null and the new value non-null;
  an update has both old and new values non-null;
  and a delete has the old value null and the new value null.

The described approach involves intercepting cache writes in two places. In the first intercept, at the client, for a transactional write the value is changed from the 'new value' to the CTWrapper object with the new value and the transaction ID.

The second intercept is in the cache node just as the new value is about to be written in the cache. At that point, the following logic is executed to implement READ_COMMITTED transactionality (note: this is for writes; read actions are described below).

It should be noted that the following describes examples of actions that may be taken (which may be the system's default behaviour); as indicated above, the actions may be configurable. For example, different policies may be defined, and the client may select a default policy and/or specify a required policy for an individual transaction.

Case 1: Incoming value NOT transactional; in-cache value NOT transactional.
The new value is just written into the cache.

Case 2: Incoming value IS transactional; in-cache value NOT transactional.
From the incoming request, the CTWrapper value is taken and the existing cache value is put into the CTWrapper's 'old value' field, then the CTWrapper object is written into the cache. The cache entry now has a transactional and a non-transactional value.

Case 3: Incoming value NOT transactional; in-cache value IS transactional.

This produces an optimistic locking exception: the transactional value effectively locks out non-transactional writes.

Case 4: Incoming value IS transactional; in-cache value IS transactional.

The action now depends on the transactions IDs in the incoming and in-cache CTWrappers. If they are the same (meaning that this update is being performed by the same transaction that originally modified the object), the 'new value' in the existing CTWrapper is overwritten by the incoming value's 'new value' and the CTWrapper object is written to the cache. As a result, a transaction can update a cache value multiple times.

If the transaction IDs are different, this means another transaction is trying to overwrite an existing transaction. This produces an optimistic locking exception: the first transaction takes precedence over later transactions.

In these examples, whether or not the in-coming value and/or the in-cache value is transactional can be determined by whether they contain CTWrapper objects or plain data objects.

For reads, the action is determined by the same cases (again, these are examples of a default policy; other policies may be selected for which different actions are carried out):

Case 1: Incoming request NOT transactional; in-cache value NOT transactional.

The returned value is the value from the cache.

Case 2: Incoming request IS transactional; in-cache value NOT transactional.

Same action as for Case 1—the returned value is the value from the cache.

Case 3: Incoming request NOT transactional; in-cache value IS transactional.

The returned value is the 'old value' from the CTWrapper object.

Case 4: Incoming request IS transactional; in-cache value IS transactional.

The action now depends on the transaction IDs in the incoming and in-cache CTWrappers. If they are the same, the 'new value' in the existing CTWrapper is returned.

If the transaction IDs are different, this means another transaction is trying to read a value already under a transaction. In this case, the system (which supports EclipseLink) returns an optimistic locking exception: the first transaction takes precedence over later transactions. In alternative policies, the action here could be to delay (i.e. waiting makes sense in a read-for-update) or to return the new dirty value.

The above rules for how reads and writes should be handled are given by way of example, and different rules may be used.

One benefit of the described approach is that it hides the movement of data between partitions: the transactional data is moved with the non-transactional data. This makes implementation easier and less error-prone.

A secondary benefit is that only one lookup and one write operation are required to read or change data that is involved in a transaction. Other implementations will typically require two lookups—one to check on the non-transactional value and one for the transactional value.

The above section describes the basic method for single-valued transaction approaches. The described mechanism may also be adapted to handle multi-value approaches as described in the next section.

Multiple Transactions and MVCC (Multi-Version Concurrency Control)

The underlying assumption behind the "one transactional user" approach described above is that there is a small probability for conflict. For example, in one bank's transactional system, amongst 20 million transactions during the course of a working day, on average 7 conflicts arose. In other words, conflicts arose so rarely that it was acceptable to catch the conflict at commit time and ask the user to redo the transaction.

However, in some industries, financial ones being an important one commercially, there are applications where this assumption would cause an unacceptable level of conflicts. These applications do long calculations—increasing the time the transaction is at risk of not completing because of conflicting transactions—and involve multiple objects from a small population (100's of financial instruments rather than millions of customers) at a high transaction rate. The overall probability is therefore high that transactions will conflict, and the cost of redoing work is also high.

The desire to avoid exception returns or delays has led to an approach to transactionality referred to as multi-version concurrency control ("MVCC"). In this approach, a deal is struck and the components of the deal are retrieved as of that time. This means that the transactional system is required to maintain more than just an old and new value. Instead it should maintain a list of prior values applicable for different transactions. For example, the price of a financial instrument (held in an object of interest) could be changed as follows:

Value at 9:00:00.000 $17.50
Value at 9:00:00.001 $17.51
Value at 9:00:00.009 $17.48
[Not yet committed] $17.49

There will be some commits on the object of interest and possibly some not yet committed.

In this approach, a transaction is associated with a start time in addition to the transaction identifier. The start time of a transaction identifies the particular value of the multiple available values that is applicable for that transaction.

The present approach assumes time synchronisation is provided by data grid (and in particular assumes that a monotonic ordered time is available to nodes in the grid, although that is not directly relevant to this aspect of the discussion). Time coordination means that the node starting a new transaction can note the time, and have that time be consistent with the time at another node; without this, clocks on different computers can drift apart and make MVCC impossible in large grids.

The scheme described previously with just old and new values can be extended to handle MVCC. In particular, in the non-MVCC approach described above, an object was replaced with a CTWrapper object as follows:

```
CoherenceCache: Map {
    key :→ CTWrapper[old value, new value, transactionID] }
```

To handle MVCC, the Map value can be converted to a list of triples that hold the information outlined in the example above, namely
  the new value
  the transaction ID
  the time the transaction committed (or empty if not yet committed).

This affects reading an object value in that there is no "exception" return. Instead, a value is returned that reflects the object value at the time that the transaction request was started. For example, if the reading transaction was started at 9:00:00.005, the system will return the object holding the value $17.51—the value current at that time. If the reading transaction was started on or after 9:00:00.009, then the $17.48 value will be used, being the last one committed. This policy ignores uncommitted values; some applications may prefer to change this policy, which can be implemented using the data as described.

When the transaction updating the object of interest is committed, the system commits to the cache adding the transaction commit time (in addition to the transaction ID). The system then adds a new triple—updated object value, the transaction ID and the transaction commit time—into the list of triples. The new triple will preferably be placed at the correct time point amongst the committed transactions in the list, and leaving uncommitted transactions at the end.

Scalable Transaction Manager

Instead of providing a single centralised transaction manager, embodiments of the present invention provide a distributed and scalable transaction manager. This distributed transaction manager is implemented in distributed form in the IMDG alongside the application services and application data.

In particular, in the same way that applications use the grid to store and process data in a scalable way, the present system uses the same facilities to store and process transaction management information to create a scalable transaction manager.

The benefit of this approach is that, as nodes come on-line or go off-line, the responsibilities for individual transactions can move around the grid in a low-pause, fully-backed up way. As the grid grows, the throughput of the aggregate "transaction manager" function grows while response time stays nearly the same.

In the present approach, some central coordination is carried out, so the total system's performance is not fully linearly scalable. However, because the vast majority of the work is carried out in the decentralised functions, the present approach is more scalable and able to handle more transactions per second than prior art approaches running on similar hardware.

Functional Split

The overall transaction management functions are split between a set of distributed Transaction Managers and a single central transaction coordinating module referred to herein as the Isolator. The transaction processing system as a whole is referred to herein as the scalable transaction manager.

A Transaction Manager is a component running in most nodes in the grid. There are thus multiple Transaction Manager instances, each handling a distinct subset of all the transactions being processed by the system. The terms "Transaction Manager" and "Transaction Manager instance" are thus essentially equivalent.

The transaction Isolator isolates transactions, so there is no leakage of data between transactions—in other words, updates are isolated when they reach the database. This means that, for any two transactions that have a common data object (which maps to a row in the database), the data from the first-committed transaction should be persisted to the database before the data from the later transaction.

The Isolator also provides support functions. A particular support function handled by the Isolator is key generation, which involves providing unique primary keys for newly-created data objects. Keys are preferably generated in batches (rather than on-demand for each new transaction). The Isolator may also generate transaction identifiers.

These functions are performed by the centralised Isolator to ensure global uniqueness of the generated keys and transaction identifiers.

However, this aspect of the Isolator does not affect its performance significantly. Each transaction typically generates 10 or more network request/response operations (often many more), whereas the key generation sends batches of keys (by default 100 at once), so the per-transaction load on the sequence generator is typically of the order of two hundredths of a network request-response (one request-response for the request and reply, one to back up the new range in-memory so a backup Isolator can take over if required).

All other functions are preferably carried out by the distributed Transaction Managers, including:
- interfacing to the client, to start, commit or rollback transactions
- committing into the grid (i.e. committing or rolling back each entry)
- logging to disk, for protection against lights-out or total grid failure
- persisting to the database.

For maximum scalability, the design preferably allows all grid nodes, except the node running the Isolator, to be Transaction Managers. However, in some situations, only a subset of grid nodes may be Transaction Managers—in order to limit the number of connections to databases for example.

Each Transaction Manager handles a subset of the transactions processed in the system. The Transaction Manager responsible for a particular transaction keeps track of the data objects involved in the transaction and logs updates made to those data objects. When the Transaction Manager is instructed to commit the transaction, the Transaction Manager processes all the objects participating in the transaction to commit the changes to each object, as discussed above in connection with FIG. 5. Subsequently, the Transaction Manager persists the changes to the database.

Whereas there can be many Transaction Managers, a single primary Isolator is provided, because its functions depend on a single point of reference (though one or more backup Isolators may be provided to take over in case of failure of the primary Isolator). For example, it is normally not possible to distribute transaction ordering: to coordinate parts of a transaction en route to the database, the data and processing to determine this should usually be placed in one node.

The Isolator nodes (primary and backup(s)) are configured to be within the grid but not to cache transactional data or processing services relating to it, but rather have their own distinct data and services.

However, in an alternative embodiment described below, multiple primary Isolators may be provided.

Operation

The operation of the transaction management system is illustrated in FIG. 6, which shows a plurality of clients, including a particular client 600 which is initiating a distributed transaction in this example. The transaction is handled by a particular Transaction Manager 604, running on a particular cache node 602 of the IMDG nodes.

The processing of the transaction proceeds as indicated by the numbered steps shown in FIG. 6, which are described below. We describe here the default operation, which emphasises safety and fully ACID operation. Configuration options are provided that can be used to specify less strict operations for applications that decide that higher performance is worth the additional risk.

Step 1. Application/JPA (Java Persistence API): Transaction.Start( )—the Client Starts a Distributed Transaction.

The transaction start request uses one of a group of transaction IDs, globally allocated by the Isolator. The request is routed across the partitioned Transaction Manager service to a selected Transaction Manager (in this case Transaction Manager 604). The Transaction Manager is preferably selected to meet load balancing requirements, though other considerations could alternatively/additionally be used.

In this example, the transaction is handled by cache node 602. The transaction manager services on other nodes (e.g. 606, 608) play no part in this transaction, though those nodes may hold application data accessed by the transaction.

Step 2. A Data Update Operation is Performed.

The data update operation results in a cache write to modify the value of a cache object. For example, the system may be implemented using a TopLink grid which maps an entity update to a cache write (integration of TopLink is described in more detail below).

Alternatively a cache write may be initiated in some other way, depending on the architecture used.

The cache write is routed across the grid to the appropriate node where the data object that is to be updated is stored, in this case node 606.

Step 2a. A copy of the new value of the object, together with the transaction ID and the type of change (insert/update/delete) is sent to the Transaction Manager service 604 which is responsible for the current transaction. This Transaction Manager therefore becomes the collection point for the data changes for this particular transaction.

The received data is written synchronously to the Transaction Manager's cache, which is normally backed up, resulting in one network hop (assuming one backup, as discussed earlier). Taking into account the hop from the originating cache node, in general this write costs two network hops.

In this implementation, the Transaction Manager uses private Coherence caches for the transaction state and the data changes just mentioned. The Isolator uses a private Cache for storing the latest primary keys allocated.

After step 2a is completed, the update operation is complete and control returns to the client.

Steps 2 and 2a are carried out repeatedly for multiple data access/update operations forming part of a transaction. This stage may also involve significant load on the different cache nodes, for data retrieval (object read) and computation on data in a node, but this has no functional impact on the Transaction Managers and Isolator.

The transaction manager thus receives and stores information specifying all the data updates made in the grid as part of the transaction. This information is used later to propagate (i.e. persist) the data updates to the persistent storage medium/media 614.

Step 3. The Client Instructs the Transaction Manager to Commit.

The application/JPA executes transaction.commit( ) to commit the transaction. This is executed in the Transaction Manager responsible for this particular transaction, i.e. Transaction Manager 604 in node 602.

Step 4. The Transaction Manager 604 changes the status of the transaction to "COMMITTING" and writes the new status into the transaction status stored in the Transaction Manager's cache. The routing of writes to this cache is designed such that this particular write goes to a local partition (i.e. on the same virtual machine) avoiding a possible network hop. The backup will however always cause one network hop (or one hop per backup if there are more than one). From the time the COMMITTING status hits the backup partition, the Transaction Manager is preferably guaranteed to commit the transaction.

The synchronous backup here is advantageous, because it enables the system to ensure that following operations do not get partially fulfilled, in the event of a failover from the Transaction Manager to a backup Transaction Manager before the transaction completes. The Transaction Manager ensures that all steps in the commit operation from this point on can be retried if they have not been noted as completed in the transaction status record.

In a variation, the write to the cache in step 4 can be omitted. This improves performance at the expense of delaying the recognition of the user's instruction to commit.

Step 5. An 'OkToPersist' request is sent to the Isolator to get permission to persist the transaction. The Isolator does two things in response. First, it allocates a "persist request number", which gives a transaction its position in the queue of requests to the Isolator so that, in the event of failover, the Isolator can correctly recreate the queues to the databases. Then, the Isolator checks whether this transaction is OK to persist and sends the result (OK, not OK) back to the Manager. Before returning to the caller of commit( ), the Transaction Manager notes the Isolator's persist request number in the transaction status.

The delay caused by a "not OK" result here ensures that consistency is preserved en route to the database—i.e. it avoids a younger transaction 'overtaking' an older transaction and leaving the wrong state in the persistent database. This is only an issue when two transactions have an object in common. This in itself is a small probability in many systems, and due to the serialisability guarantees of the transaction mechanism itself—a client will have to wait until the older transaction commits before executing and committing the younger transaction, this possible 'overtaking' may seem a vanishingly small possibility. However, large distributed systems built on Java have to contend with garbage collection and other interruptions to service that may last many seconds, so this possibility is not as small as it might first seem.

A transaction is preferably never discarded if a database is unavailable: the system waits until the database becomes available. This reflects the meaning of "commit"—once the transaction manager commits to the client, the transaction must be completed to persistent store. While a database is down, transactions will be held in-memory at the transaction manager. An alternative implementation at this point is to roll out pending transactions to persistent store if a database is unavailable and remove them from in-memory, in order to make the time that the transaction manager can operate in this way unlimited.

In a first implementation of this step, a transaction is OK to persist if it has no objects in common with prior transactions that are 'in play'—i.e. not yet persisted, to the knowledge of the Isolator. If there is such a prior transaction, the later transaction is held back until any prior transactions complete. Note that this algorithm operates across databases, so it has the advantage that, while components of a transaction appear at the databases at different times, a database will not get two steps behind another.

In an alternative implementation, the OK to persist calculation is done per-database. Although this approach means that there is no guarantee that the databases can be only a single step apart, it does mean that a database being down does not hold up writes to other databases.

Step 6. At this stage the Transaction Manager executes the following steps 6a and 6b in parallel:

Step 6a. A log of the data changes is recorded to the local transaction logger 616. In the events of a complete "lights out" failure of the system, this log can be used to recreate the committed transactions at the persistent data storage system.

Step 6b. Commit to the cache nodes.

In the application cache, all objects are in their transactional state until the Transaction Manager instructs the data node to commit. When this is done, it frees up the objects to be updated by other client transactions.

Specifically, the Transaction Manager has a record of each of the data updates performed as part of the transaction. This information was collected in step 2a above. For each object involved in the transaction, the Transaction Manager now sends a commit instruction to the node in the grid where that object resides (in practice, the commit instruction may be routed to the appropriate node automatically by the grid based on the object key). At the relevant node, the transaction wrapper object to which the object key maps is then replaced with the new object value as described above in relation to FIG. 5. The Transaction Manager keeps track of the objects for which the commit processing has been completed (so that a backup Transaction Manager can take over in case of failover). Once all the objects that are part of the transaction have been updated in this way, the transaction has been committed, and the Transaction Manager updates the transaction status for the transaction accordingly.

Note that the commit step preferably occurs strictly after step 5. This means that a later transaction cannot get an OKToPersist for an object/table row before an earlier transaction: the later transaction cannot update in the grid before the previous transaction commits to the cache nodes. This dependency guarantees isolation.

Step 7. The transaction.commit( ) now returns to the client. The client can continue: the grid is now consistent and the transaction is logged; although the data is probably not yet persisted to disk.

Step 8. Once an "OK to persist" indication has been received by the Transaction Manager from the Isolator the transaction is persisted to the database(s) 614 by the Transaction Manager. The "OK to persist" indication may have been received in the reply to step 5 (if the transaction could already be persisted at that point).

Alternatively, if the transaction could not be persisted at that stage, typically because the transaction is dependent on some other transaction being persisted first, then the "OK to persist" message will not have been sent in step 5. Instead, the Isolator will send the message at a later point, once it has determined that the transaction can be persisted.

In particular, the Isolator will at some point receive a "Persisted" message from a transaction manager relating to some other transaction, confirming that the other transaction has been persisted. In response, the Isolator updates information it holds relating to transaction dependencies. It may then determine that the current transaction can now be persisted, and sends the "OK to persist" message to the Transaction Manager for the transaction, the sending being either direct to the Transaction Manager for the transaction or indirectly via the Transaction Manager sending the "Persisted" message. This process is described in more detail below.

Step 9. The following steps 9a and 9b are performed in parallel:

Step 9a. The Transaction Manager notifies the Isolator that the transaction has been persisted. As described above, this may cause some other transactions to be "OK to persist", resulting in an "OK to persist" message to the appropriate Transaction Manager, which triggers step 8 for those transactions.

Step 9b. In parallel, the Transaction Manager writes to the log that the transaction is completed, so that, if the system is recovered after a failure, this transaction will not be written to the target database(s) again.

Ensuring Isolation

Transaction processing systems generally aim, as far as possible, to achieve the four properties of atomicity, consistency, isolation and durability (ACID).

In a distributed system, efforts are also made to remove the burden of concurrency and timing issues from developers, so average developers can build distributed applications. Isolation is an important component in achieving this.

The present approach is designed to minimize or at least reduce the load on the Isolator, because the Isolator (being a single centralised component) represents the limit to scalability.

Isolation is achieved in the present approach by way of the following algorithm:

1. The request in step 5 above, from the Transaction Manager to the Isolator, contains the transaction number and the identity of all the objects involved in the transaction e.g.:
   transaction=#27: objects={Customer #15; Order #40}.

2. The Isolator assigns a persist request number.

3. It then appends (i.e. adds at the end) the transaction number to a list of in-play transactions for each domain object. In other words:
   Map InPlayObjects(DomainObject)→Transaction List
   The Transaction List for each object has the earliest transaction first.

4. If the transaction appears as the first transaction in the transaction list for each participating object—meaning it is not waiting on any other transactions to complete, then the Isolator responds "OK To Persist". If not, this means at least one of the objects must wait for another transaction to persist, so the negative response is sent.

Even if the transaction now is "OK to persist", the Isolator also sends the persist request number, so that the Isolator's tables can be recreated in the correct order should the Isolator fail and require recovery.

Figure 7:
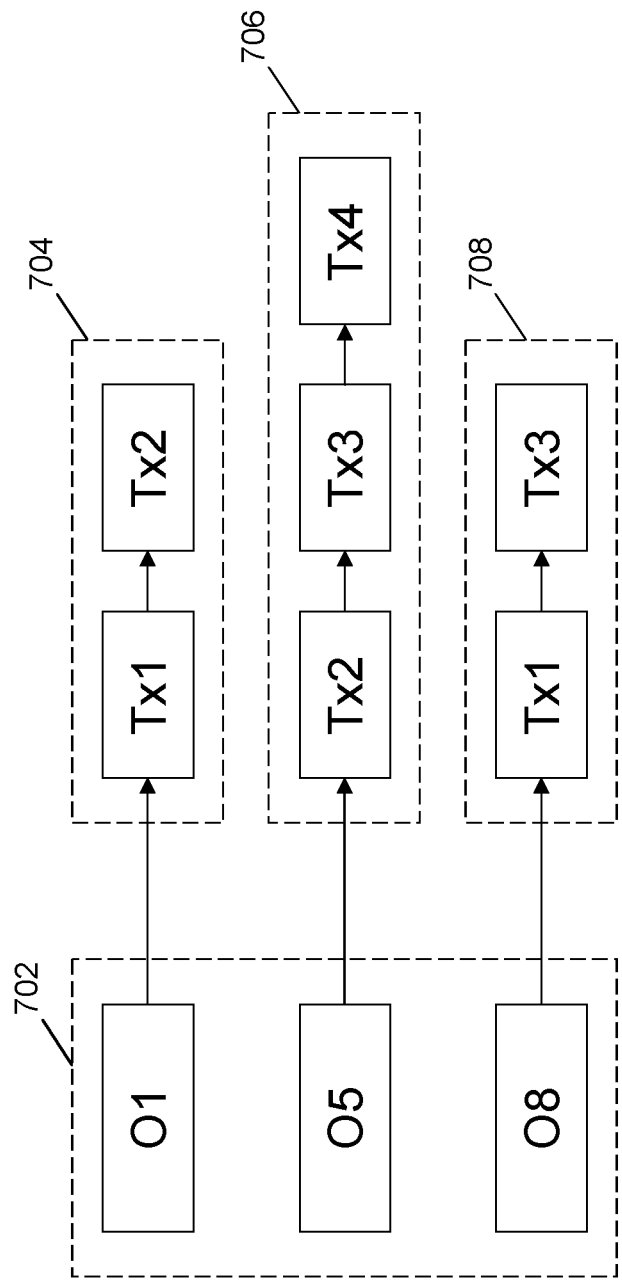
FIGS. 7, 8A and 8B illustrate tracking of transaction dependencies by the distributed transaction processing system.

The described approach is illustrated with an example in FIG. 7, which shows the data maintained by the Isolator in order to track dependencies between transactions.

In the example shown, there are three data objects O1, O5, O8 (collectively 702) that are "in play", i.e. currently being modified by one or more transactions. Each of the in-play objects 702 is associated with a respective list 704, 706, 708 of the transactions modifying that object.

In this example, object O1 is associated with a list 704 listing transactions Tx1 and Tx2. Object O5 is associated with a list 706 of transactions Tx2, Tx3 and Tx4. Object O8 is associated with a list 708 of transactions Tx1 and Tx3.

Each list indicates the order in which the transactions were logged at the Isolator (specifically, the order in which "OK to persist" requests were received and persist request numbers were allocated for the transactions).

Thus, when transaction Tx1 was logged at the Isolator, the request sent to the Isolator included the list of objects manipulated by transaction Tx1 as described above, in this case objects O1 and O8. In response, the Isolator added transaction Tx1 to the transaction lists for objects O1 and O8 (lists 704 and 708).

Subsequently, transaction Tx2 was logged, specifying objects O1 and O5 as the objects participating in the transaction, and the Isolator thus added transaction Tx2 to the end of the respective transaction lists (in this case lists 704 and 706). Following that, transactions Tx3 and Tx4 were then logged by the Isolator in the same way.

The resulting data structure is shown in FIG. 7, and indicates the dependencies that exist between the transactions. For example, it can be seen that transaction Tx2 cannot be persisted until Tx1 has been persisted, because Tx1 was logged before Tx2 and both have an object in common (O1). Tx2 is therefore not at the head of the transaction list 704 for object O1. Tx2 is not dependent on any other transaction apart from Tx1, because, for its other participating object O5, it appears at the head of the associated list 706.

Tx1, on the other hand, appears at the head of the lists for each of its objects, O1 and O8, and is thus not dependent on any other transaction. Tx1 can therefore be persisted to the persistent storage medium, and at this stage the Isolator accordingly sends the "OK to persist" indication to the relevant Transaction Manager responsible for Tx1.

Figure 8B:
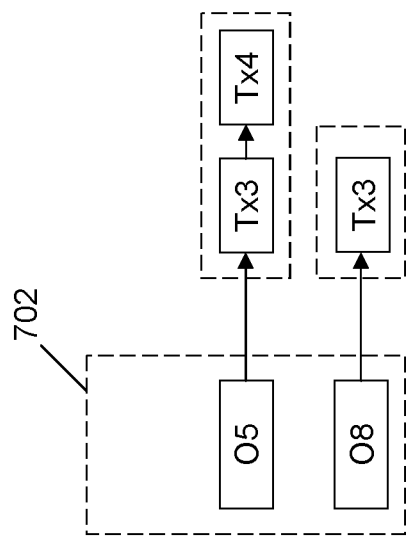
Figure 8A:
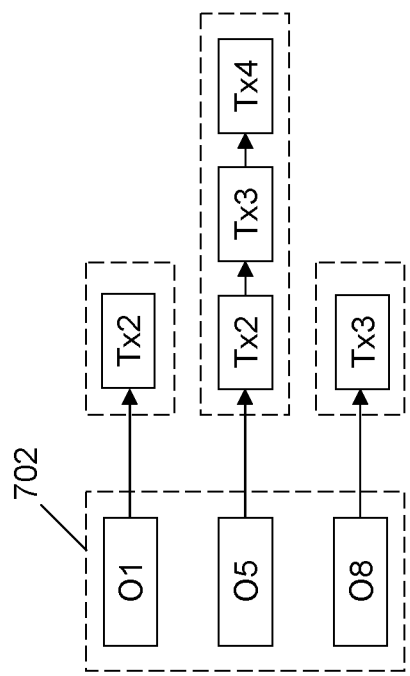

Once the Isolator receives a confirmation from the Transaction Manager that Tx1 has been persisted, Tx1 is removed from any transaction lists in which it appears. The state of the lists at this point is illustrated in FIG. 8A. Tx2 was previously dependent on Tx1 but has now moved to the head of each of its participating objects' lists and can thus now also be persisted. The Isolator accordingly sends the "OK to persist" indication for Tx2 and, once confirmation is received that Tx2 has been persisted, removes Tx2 from the lists, resulting in the state shown in FIG. 8B, in which transaction Tx3 is now ready to be persisted.

In preferred embodiments, the Isolator maintains information only for objects that are in play, i.e. currently involved in any transaction, and therefore object O1 is removed from the set of in-play-objects 702 at this stage.

The above approach thus ensures that the different transactions' updates are propagated to the persistent storage medium in the correct order, which in turn ensures that the data in the persistent storage medium is maintained in a consistent state. For example, Tx1's updates to objects O1 and O8 will be implemented in the persistent storage medium (e.g. a relational database) before Tx2's updates to objects O1 and O5.

In a variation of the implementation described above, it is possible for the Transaction Manager to ask the Isolator— instead of "Can I commit this transaction"—the question "Can I commit the components of this transaction to a given database". The algorithm is the same, but the lookup of transactions will be done separately for each database. The Isolator then responds to the Transaction Manager with possibly multiple messages saying, e.g., "commit Transaction X to database D". Though this can increase overhead, an advantage of this approach is that it allows the Transaction Manager to continue to commit transactions to all the reachable databases, even when one database goes off-line.

In a further variation, if one of the databases is unreachable, the Transaction Manager could delete records relating to the objects/rows that have been persisted to the other, reachable databases, leaving only the unreachable database's records occupying memory. Although this may increase overhead it may also increase the time that the complete application can continue with a database unreachable.

Avoiding the Need to Save In-Play State at the Isolator

An advantageous feature to achieve optimal performance is that the Isolator does not save the in-play state to a cache or persistent storage. Were this necessary, it would significantly reduce the limit to scalability of the Isolator: current performance levels of the Isolator are measured in hundreds of thousands of objects/database rows per seconds put in play for persisting and finished persisting. It would also at least halve the response time at the Manager-to-Isolator boundary, because of the need to back up this state to another node.

Preferred implementations of the present system make this possible by recreating the state of the Isolator after a failover. When the original Isolator goes down, the system pauses normal operations to the new Isolator while it recovers the Isolator state. It sends a request to each Transaction Manager in the grid and requests the current list of in-play transactions—those that the Manager has requested permission to persist from the Isolator and has not yet notified the Isolator that the transaction has persisted. (If the transaction has persisted, there is no need to send the duplicate request from the Manager to the Isolator: because the transaction has persisted, it is no longer in play and will not hold up subsequent persist requests.) The Manager sends the list to the Isolator. The Isolator sorts all the responses by their persist request number, thereby recreating the exact order that the requests were acted on by the original Isolator. The new Isolator calculates the correct responses to all the Managers of those requests that are now OkToPersist, thereby reproducing the correct Isolator state at this point in time. The new Isolator sends the OkToPersist indications to the manager together with the indication that normal Manager-Isolator activities can be resumed.

Scalability—Performance with Scale

This section briefly outlines the amount of additional performance that may be possible as the system scales.

Scalability is an important metric for many technical decision-makers, because it gives an upper limit on the capability of the system. It is a metric that should roughly stay the same with advances in technology: if all the capable parts increase in performance, the overall system performance should increase likewise. According to current predictions this rough equivalence in power of the components important to typical implementations of the present system is likely to continue for the next decade.

In order to scale the Isolator as far as possible, three techniques are adopted in the present approach. One element is the isolation algorithm described above. This algorithm specifically avoids or at least reduces the need to save any state outside of the Isolator's memory to a backed-up cache in the grid or to persistent storage (there is the state required for generation of unique IDs/keys, but this is insignificant, as described previously).

For a system where the number of overlaps between transactions is small, this algorithm minimises the calculation time at the Isolator: the cost tends towards one map get( ), put( ) and remove( ) operation per object/row. Modern CPUs (e.g. Intel i7 series) execute these three operations on the Java HashMap in Java in a little over 250 ns per core. A two-socket, 8-core machine—commodity hardware as of this writing—will therefore execute the algorithm in 33 ns in aggregate, or 30 million rows per second. This is fast enough that the algorithm itself will typically not limit scalability; the network—its performance and management—is likely to be the limiting factor in commodity hardware installations.

The other two techniques are designed to limit the number of messages that flow between the Transaction Manager and the Isolator, to thereby move out the point where the scalability limit is reached.

One of these is to box-car (or aggregate) multiple programmatic messages into a single wire message. The number of network request/responses between the Isolator and the Transaction Manager in the above-described approach is 2 or 3 logical messages (depending on whether the "OK to Persist" confirmation is sent immediately in response to the "Ok to persist" request in step 5 above or as a separate message later on).

In an environment where routers can handle large grids with a small number of physical transmission hops (e.g. 240 nodes connected through 2 router hops), aggregation can make a big difference where the serialisation technique is efficient.

For an individual message in a low-load environment, box-carring (i.e. transmitting multiple logical messages in a single transmission) can reduce performance: it may add delays that might not have been necessary and also introduce an unnecessary context switch. However, in appropriate circumstances box-carring can have a significant impact on system performance. In the present system, the connection between the Transaction Managers and the Isolator will typically carry a high volume of logical messages, so box-carring may be particularly effective: there will be no appreciable delay in high-volume operations because there will typically be multiple messages to be sent at peak load.

The other technique is multiplexing (piggybacking) All the logical request-response pairs can be collected into a single request-response pair. For example, the messages of steps 5 and 9a can be sent in one request; and the "OK To Persist" message in step 7, when it is necessary, can be piggy-backed onto the replies to messages 5 and 9a.

FailOver

Failover is handled differently for the Transaction Manager and Isolator nodes.

The Isolator is simpler, because it operates with only a single partition—it ensures this in the way it uses data affinity. Thus if the Isolator fails over, its partition gets moved to one of the other nodes which can immediately start providing services. Preferably, to simplify failover, the Isolator function itself does not hold any state: that is done by the Transaction Managers, because they scale-out and so can absorb extra writes without limiting total system performance.

For the Transaction Manager, failover is as for the normal cache nodes. However, what this means is that the management of transactions after the failover will be evenly distributed across the grid: each existing cache node will pick up some of the failed node's transactions.

Scaling the Isolator

In the embodiment described above, multiple independent transaction managers are provided running in the grid. The number of transaction managers can be changed depending on requirements, e.g. by adding transaction managers to increase throughput.

Although the present approach aims to carry out as much work as possible at the transaction managers and as little as possible at the Isolator (to maximise scalability), the Isolator may nevertheless in some circumstances limit scalability. Scalability may be further improved by scaling the Isolator itself, so as to provide multiple concurrently running Isolators.

One way of achieving this is to split the Isolator so it is per-database, or per group of databases (in other words, one Isolator per target persistence medium, or per group of target persistence media).

In the previously described approach, transactions are kept in order across the databases, in the sense that one database can never get more than one transaction ahead of another one. If that feature is not required, then the isolator can be scaled out.

This approach fits well with sharding. The unit of scalability on the database side can then be [one DB shard+one Isolator]; although for performance or cost reasons an intermediate aggregation may be preferred.

With this approach, there is then there is no single point of bottleneck, since both the Transaction Managers and the Isolators are scalable.

Furthermore, the Transaction Managers and the Isolators can be scaled independently and in natural scale-out units (i.e. in the grid, the unit of scale-out is [one cache node+one transaction manager] and at the persistent data store, the unit of scale-out is [isolator+data store]).

More specifically, in this approach, multiple Isolators are provided, with each Isolator responsible for a subset of the persistent storage media/subsystems (e.g. the different persistence media 614 illustrated in FIG. 6). Each Isolator maintains data structures like those illustrated in FIGS. 7-8 for the particular data objects that are associated with (and need to be persisted to) the particular database(s) for which the Isolator is responsible.

The Transaction Managers are modified so that they obtain permission to persist by querying multiple Isolators (in each case, requesting permission to persist data updates specifically for the database(s) for which the Isolator is responsible). Permission to persist is then received independently for each database (or group of databases) from the relevant Isolator. This means that updates can be persisted independently to multiple databases.

A further variation of this is to allow the databases to always go at their own speed even if they are handled by the same Isolator. The request to the Isolator would then have to include the target database with each object key identifying a data object modified by a transaction.

Indexing And Searching

To speed searching, datastores—including grids—build indexes of the objects stored in the caches. In other words, if Customer 15's last name is "Wilson", there will be an index for "Wilson" pointing to a collection of Customers, one of which will be Customer 15. This speeds up searches, whether by exact match or algorithmic match.

In the presently described system, when an object that is under a transaction is indexed, it may have two different values for the same field, one in the old object, one in the new object (see FIG. 5). For example, we may be in the process of changing a newly-married woman's name from "Wilson" to "Smith". The present transactional scheme handles this in the following manner.

First, it should be noted that, in a transactional system, the fields that are indexed tend to be longer-lasting than other fields, because the indexed fields tend to be indicators of an entity's real-world identity. For example, surname, customer number or zip code tend to be indexed to speed up customer lookup. Since these typically change infrequently, for many OLTP (online transaction processing) applications, this issue will be minor.

Of course, transactional systems differ in this regard from analytics systems, which tend to do deep analysis of data, where non-identity information may be of interest—where an item was bought, the price paid, or the purchasing route. Analytics applications may therefore make more use of the approach described here.

One approach to handling indexes is as follows:

Where indexed fields differ in an object under a transaction—"Wilson" changes her name to "Smith"—two index entries are made: one is for the old value, one for the new. In our example, when the transactional value is registered, the system ensures the object is indexed twice, in the "Wilson" and "Smith" indexes.

Searches of the indexes may be handled as follows. For example, a search of the name index is done for "Wilson". The index will hold, amongst others, Customer 15. It is appropriate to use that value if the index request is not under the transaction that changed Customer 15. If the search request is made under that transaction, the system removes Customer 15 from the search list.

The same strategy, but applied in a complementary way, is applied to the search for "Smith". Customer 15 is only returned in the result collection if the search is made under the transaction that changed Customer 15; otherwise, it is removed from the result set.

Persisting Updates to the Persistence Medium

As discussed above, once a Transaction Manager has received an "Ok to Persist" indication for a transaction from the Isolator, the Transaction Manager persists the transaction. This is done via a persistence interface as illustrated in FIG. 1. The persistence interface may include interfaces to a number of different persistent storage media or other systems (as illustrated in FIG. 6).

A single transaction may involve data updates to multiple separate persistence targets, e.g. multiple separate databases. Nevertheless, distributed transactions are not necessary at this stage because the system has already resolved the distributed aspect of the transaction by way of the mechanisms described above. Instead, the system uses direct connections to each database, which can sustain much higher performance than distributed transactions. The persistence interface preferably reorders the individual row changes so that prepared statements can be used, which for some databases makes a big difference to performance (e.g. insert operations to MySQL are much faster if batched together in this way)

To persist a transaction (which has already been committed in the in-memory data grid), the data updates performed by that transaction are propagated to the persistence medium (e.g. database 108 of FIG. 1). As described above, the Transaction Manager has records of the data updates performed for that transaction (collected in step 2a of FIG. 6). Based on these records, the Transaction Manager sends information to the persistence medium to implement corresponding updates in the persistent copy of the data stored there.

Implementation Details

Implementations of the above system may utilise TopLink to provide the mapping between object (at the user layer) and database format. It is useful to think of it in two parts: talking to the user in objects, and talking to the database in SQL. In the middle is the cache, which is stored in the in-memory data grid. The in-grid format can be provided by TopLink Grid. This results in the following architectural layers:

client program
TopLink/Grid, providing the object view and mapping to . . .
Coherence Client requests
Coherence Server services
TopLink/Grid managing the in-Grid format
TopLink managing the path to the database (using configuration from the user)

Implementations of the present system can interweave with all the various parts of TopLink Grid:

on the client, it catches and wraps requests to Coherence
on the Server, it makes use of the standard Coherence grid management, but adding the functionality described above
on the database side, it uses the TopLink path to the database but controls it after doing all reordering of database updates.

Alternative Approaches to Storing Transactional State

In the above examples, transactional state is stored by way of the transaction wrapper object, which replaces the original object in the cache (but contains a copy of the original object to enable rollback, in addition to the updated object value).

An alternative approach instead uses object decorations to store transactional state.

In software patterns, a decorator is an approach that keeps the original functionality of an object unchanged, but dynamically adds extra behaviour for a particular context. For example, in Java, a basic object may support additional functionality specified in a "properties map". These properties do not alter the behaviour of the basic object, but they do affect behaviour in specific circumstances.

For example, a connection to a database in JDBC can be made via a DriverManager. One variant of the getConnection( ) method takes a Properties object to allow the caller to specify secondary characteristics for the database connection (in addition to the database's URL).

Where the IMDG implementation supports adding decorations onto a cache value, this can also be used to implement the transactional features rather than using a wrapper.

In this case, the committed (i.e. original, pre-transaction) value would be unchanged after a transactional update operation—it will remain stored in its standard (i.e. unwrapped) form.

The transactional information, including the new (or transactional) object value, transaction ID, transaction state etc., is then added as additional properties or decorations.

A benefit of this approach is that the committed object remains available to programs that are unaware of, or are not concerned by, transactionality.

Yet another approach to storing transactional information is by use of a side cache.

A side cache can be used to add transactional information without changing the original cache value. In particular, a side cache is an additional cache in the IMDG that is preferably constructed purely for keeping transactional information. For example, the transaction information for the basic "CustomerCache" could be kept in the "CustomerTransactionalCache".

The same key (e.g. "15") can be used to reference information in these two caches. CustomerCache(15) addresses the original value; CustomerTransactionalCache (15) addresses the transactional information.

As for the decorations example, transactional updates leave the original object in the main cache unmodified, adding transactional information including the new object value to the transactional side cache to enable handling of the transaction and rollback if necessary. As before, this provides READ COMMITTED semantics to non-transactionally-aware programs while the transaction is in progress.

In this approach it is preferred that the two caches are partitioned and backed up to the same nodes (so that transactional information resides in the same node as the associated objects under transaction). This ensures that references to the transactional information do not cause additional network calls.

For implementations using wrapper objects or decorations, the transaction information is directly associated with the object under transaction, and will thus reside on the same node (and in the same cache).

It will be understood that the present invention has been described above purely by way of example, and modification of detail can be made within the scope of the invention.

For example, though described above in the context of Oracle's Coherence product, the present approach can be used with any other suitable data storage system (whether memory or disk-based) and/or with any other suitable grid processing architecture. The present approach can also be adapted for use with other distributed architectures or with non-distributed (single-processor) architectures.

For example, the present approach can be used directly with any storage systems which associate data objects with key values (whether grid-based or not), but can also be adapted for use with other types of storage systems that do not use a key-based approach. Instead of the IMDG cache architecture illustrated in FIG. 1, the present approach could be implemented directly in the target database (which could be an object database or a relational database).

Examples of systems where the present approach can be advantageously employed include other in-memory data grids that use a similar dynamic, small-partition approach as Coherence—for example Gemfire, GridGain and JBoss. The present approach could also be used with NoSQL systems such as Cassandra that use a dynamic, micro-partition scheme. Alternative grid architectures such as Gigaspaces could also be used.

Although certain preferred implementations operate in object-oriented environments (such as Java environments), in which the data objects referred to above are typically objects in the narrower sense of the object-oriented context (e.g. Java objects), the term "data objects" used herein may refer to any suitable data entities, as appropriate in the implementation context. For example, data objects may be simple data values (e.g. fields, attributes or variables) or complex (multi-value) data structures (e.g. records, table rows, objects).

Also, although described above in relation to Java environments, other programming language and execution environments may be used, such as environments based on C# or .NET.

The invention claimed is:

1. A method of performing transactional data accesses in a data storage system, wherein the data storage system comprises an in-memory data grid comprising a plurality of processing and data storage nodes, wherein the data storage system is configured to store a plurality of data entities identified by respective key values at nodes of the grid and to route data accesses to nodes of the grid based on specified key values, the method comprising:
receiving a request to modify a value of a data entity stored in the in-memory data grid from a first value to a second value, the request associated with a distributed transaction being executed in the in-memory data grid and including a key value identifying the data entity to be modified, wherein the in-memory data grid has a key mapping that maps the key value to the data entity;
in response to the request, creating a transactional data entity, the transactional data entity including information specifying the first value, the second value, and a transaction identifier for the distributed transaction;
storing the transactional data entity in the in-memory data grid, the storing comprising;
replacing the data entity with the transactional data entity, and
changing the key mapping for the key value so that the key value maps to the transactional data entity in the in-memory data grid instead of to the data entity;
in response to a subsequent request to access the data entity where the subsequent access request specifies the key value, accessing the transactional data entity instead of the data entity, and processing the subsequent request in dependence on the type of access, the processing comprising at least one of:
when the subsequent request is a request to modify or delete the data entity, rejecting the request, and
when the subsequent request is a request to read the data entity, returning a value for the data entity in response to the request.

2. The method according to claim 1, wherein the request specifies at least one of: the second value; and the transaction identifier.

3. The method according to claim 1, wherein creating the transactional data entity comprises adding transactional data entity to the data entity, as one of the following: as one or more additional properties and as one or more decorations of the data entity.

4. The method according to claim 2, comprising:
receiving a subsequent request specifying a second transaction identifier; and
processing the subsequent request in dependence on one of the following: the second transaction identifier and whether the second transaction identifier corresponds to the transaction identifier specified in the request.

5. The method according to claim 4, comprising rejecting the subsequent request when the second transaction identifier does not correspond to the transaction identifier, rejecting the subsequent request when the subsequent request is for one of the following: a write access and a read access, returning one of the first value; and the second value in dependence on whether the second transaction identifier corresponds to the transaction identifier.

6. The method according to claim 1, comprising processing the subsequent request in dependence on a policy.

7. The method according to claim 1, comprising:
receiving a request to commit the transaction; and
in response to the request, storing an updated data entity in the data storage system, the updated data entity having the second value, and associating the updated data entity with the key value.

8. The method according to claim 7, further comprising one of the following: replacing the transactional data entity with the updated data entity and deleting the transactional data entity.

9. The method according to claim 7, wherein the data entity and the updated data entity have a first data structure and the transactional data entity has a second data structure different from the first data structure.

10. The method according to claim 1, comprising:
receiving a further request to modify the value of the data entity; and
modifying the transactional data entity to include information relating to the further requested modification, wherein the transactional data entity specifies a plurality of modified values for the data entity, each modified value optionally associated with a respective transaction identifier.

11. The method according to claim 10, wherein the transactional data entity includes time values associated with respective values for the data entity.

12. The method according to claim 11, comprising, in response to a read request specifying the key value, returning one of a plurality of values for the data entity specified in the transactional data entity in dependence on their associated time values.

13. The method according to claim 12, wherein the read request is associated with a transaction time, the method comprising comparing the transaction time to the time values associated with the plurality of values and returning a selected one of the plurality of values in dependence on the comparison.

14. The method according to claim 11, wherein each of the plurality of values is associated with a transaction, the transactional data entity including, for each value, a time value indicating when the associated transaction was committed or an indication that the associated transaction has not been committed.

15. A non-transitory computer-readable medium comprising software code adapted, when executed on a data processing apparatus, to perform a method of performing transactional data accesses in a data storage system, wherein the data storage system comprises an in-memory data grid comprising a plurality of processing and data storage nodes, wherein the data storage system is configured to store a plurality of data objects identified by respective key values at nodes of the grid and to route data accesses to nodes of the grid based on specified key values, the software code configured to:
  for a data object stored in the data storage system and having a first object value, receiving a request to modify the value of the data object to a second object value, wherein the request is associated with a distributed transaction being executed in the in-memory data grid and specifies the second object value and a key value identifying the data object to be modified, wherein the in-memory data grid has a key mapping which maps the key value to the data object;
  in response to the request, creating a transactional data object, the transactional data object specifying a transaction identifier, the first object value and the second object value;
  storing the transactional data object in the in-memory data grid, the storing comprising:
    replacing the data object with the transactional data object, and
    changing the key mapping for the key value so that the key value maps to the transactional data object in the in-memory data grid instead of to the data object; and
  in response to a subsequent request to access the data object where the subsequent access request specifies the key value, accessing the transactional data object instead of the data object, and processing the subsequent request in dependence on the type of access, the processing comprising at least one of:
    when the subsequent request is a request to modify or delete the data object, rejecting the request, and
    when the subsequent request is a request to read the data object, returning a value for the data object in response to the request.

16. A data storage system comprising an in-memory data grid having a plurality of processing and data storage nodes, the data storage system configured to store a plurality of data entities identified by respective key values at nodes of the grid and to route data accesses to nodes of the grid based on specified key values, the data storage system further configured to:
  receive a request to modify the value of a data entity having a first value to a second value, the request associated with a transaction and including a key value identifying the data entity to be modified, wherein the in-memory data grid has a key mapping which maps the key value to the data entity;
  in response to the request, create a transactional data entity, the transactional data entity including information specifying the first value, the second value, and a transaction identifier for the transaction;
  store the transactional data entity in the data storage system, the system being configured to store the transactional data entity comprises the system being configured to:
    replace the data entity with the transactional data entity, and
    change the key mapping for the key value so that the key value maps to the transactional data entity in the in-memory data grid instead of to the data entity; and
  in response to a subsequent request to access the data entity where the subsequent access request specifies the key value, to access the transactional data entity instead of the data entity, and to process the subsequent request in dependence on the type of access, the processing comprising at least one of:
    when the subsequent request is a request to modify or delete the data entity, rejecting the request, and
    when the subsequent request is a request to read the data entity, returning a value for the data entity in response to the request.

17. A method of performing transactional data accesses in a data storage system, wherein the data storage system comprises an in-memory data grid comprising a plurality of processing and data storage nodes, wherein the data storage system is configured to store a plurality of data entities identified by respective key values at nodes of the grid and to route data accesses to nodes of the grid based on specified key values, the method comprising:
  receiving a request to modify a value of a data entity stored in the in-memory data grid from a first value to a second value, the request associated with a distributed transaction being executed in the in-memory data grid and including a key value identifying the data entity to be modified, wherein the in-memory data grid has a key mapping which maps the key value to the data entity;
  in response to the request, creating a transactional data entity, the transactional data entity including information specifying the first value, the second value, and a transaction identifier for the distributed transaction, wherein creating the transactional data entity comprises adding transactional data to the data entity, as one or more additional properties or as one or more decorations of the data entity;
  storing the transactional data entity in the in-memory data grid, the storing comprising replacing the data entity with the transactional data entity; and changing the key mapping for the key value so that the key value maps to the transactional data entity in the in-memory data grid instead of to the data entity; and
  in response to a subsequent request to access the data entity where the subsequent access request specifies the key value, accessing the transactional data entity instead of the data entity.

18. A method of performing transactional data accesses in a data storage system, wherein the data storage system comprises an in-memory data grid comprising a plurality of processing and data storage nodes, wherein the data storage system is configured to store a plurality of data entities identified by respective key values at nodes of the grid and to route data accesses to nodes of the grid based on specified key values, the method comprising:

receiving a request to modify a value of a data entity stored in the in-memory data grid from a first value to a second value, the request associated with a distributed transaction being executed in the in-memory data grid and including a transaction identifier for the distributed transaction and a key value identifying the data entity to be modified, wherein the in-memory data grid has a key mapping which maps the key value to the data entity;

in response to the request, creating a transactional data entity, the transactional data entity including information specifying the first value, the second value, and the transaction identifier, wherein creating the transactional data entity comprises adding transactional data to the data entity, as one or more additional properties or as one or more decorations of the data entity; and storing the transactional data entity in the in-memory data grid, the storing comprising replacing the data entity with the transactional data entity; and changing the key mapping for the key value so that the key value maps to the transactional data entity in the in-memory data grid instead of to the data entity, whereby subsequent requests to access the data entity referenced by the key value result in the transactional data entity being accessed instead of the data entity;

and wherein the method further comprises:

receiving a subsequent request for accessing the data entity and specifying a second transaction identifier, and processing the subsequent request in dependence on the second transaction identifier or in dependence on whether the second transaction identifier corresponds to the transaction identifier specified in the request.

19. A method of performing transactional data accesses in a data storage system, wherein the data storage system comprises an in-memory data grid comprising a plurality of processing and data storage nodes, wherein the data storage system is configured to store a plurality of data entities identified by respective key values at nodes of the grid and to route data accesses to nodes of the grid based on specified key values, the method comprising:

receiving a request to modify a value of a data entity stored in the in-memory data grid from a first value to a second value, the request associated with a distributed transaction being executed in the in-memory data grid and including a transaction identifier for the distributed transaction and a key value identifying the data entity to be modified, wherein the in-memory data grid has a key mapping which maps the key value to the data entity;

in response to the request, creating a transactional data entity, the transactional data entity including information specifying the first value, the second value, and the transaction identifier; and storing the transactional data entity in the in-memory data grid, the storing comprising replacing the data entity with the transactional data entity; and changing the key mapping for the key value so that the key value maps to the transactional data entity in the in-memory data grid instead of to the data entity, whereby subsequent requests to access the data entity referenced by the key value result in the transactional data entity being accessed instead of the data entity;

the method further comprising:

receiving a subsequent request to access the data entity, specifying a second transaction identifier, and processing the subsequent request in dependence on the second transaction identifier or in dependence on whether the second transaction identifier corresponds to the transaction identifier specified in the request, the processing comprising one of:

if the subsequent request is for a write access, rejecting the subsequent request if the second transaction identifier does not correspond to the transaction identifier;

if the subsequent request is for a read access, returning either the first value or the second value in dependence on whether the second transaction identifier corresponds to the transaction identifier.

\* \* \* \* \*